US009749970B2

(12) United States Patent
Vajapeyam et al.

(10) Patent No.: US 9,749,970 B2
(45) Date of Patent: Aug. 29, 2017

(54) POWER CONTROL AND POWER HEADROOM FOR COMPONENT CARRIER

(71) Applicant: QUALCOMM Incorporated, San Diego, CA (US)

(72) Inventors: Madhavan Srinivasan Vajapeyam, San Diego, CA (US); Jelena Damnjanovic, Del Mar, CA (US); Peter Gaal, San Diego, CA (US); Wanshi Chen, San Diego, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/045,603

(22) Filed: Feb. 17, 2016

(65) Prior Publication Data

US 2016/0255594 A1    Sep. 1, 2016

Related U.S. Application Data

(60) Provisional application No. 62/121,942, filed on Feb. 27, 2015.

(51) Int. Cl.
*H04W 52/34* (2009.01)
*H04W 52/36* (2009.01)
*H04W 52/14* (2009.01)

(52) U.S. Cl.
CPC ....... *H04W 52/346* (2013.01); *H04W 52/365* (2013.01); *H04W 52/146* (2013.01)

(58) Field of Classification Search
CPC  H04W 52/146; H04W 52/346; H04W 52/365
(Continued)

(56) References Cited

U.S. PATENT DOCUMENTS 8,837,526 B2 * 9/2014 Li ................ H04L 5/0007
370/482
9,585,145 B2 * 2/2017 Ranta-Aho ....... H04W 72/0406
(Continued)

FOREIGN PATENT DOCUMENTS

| EP | 2779513 A2 | 9/2014 |
|---|---|---|
| WO | WO-2012024338 A1 | 2/2012 |
| WO | WO-2015153382 A1 | 10/2015 |

OTHER PUBLICATIONS

ISA/EP, Partial International Search Report of the International Searching Authority, Int'l. App. No. PCT/US2016/018492, May 24, 2016, European Patent Office, Rijswijk, NL, 8 pgs.
(Continued)

*Primary Examiner* — Tan H Trinh
(74) *Attorney, Agent, or Firm* — Holland & Hart LLP

(57) ABSTRACT

Methods, systems, and devices for wireless communication are described. A user equipment (UE) may coordinate power utilization across component carriers (CCs) with different transmission time interval (TTI) configurations. For example, the UE may reserve a portion of the transmit power for a CC with a reduced TTI length (e.g., an enhanced CC (eCC)). In other examples, the UE may dynamically allocate power between CCs with overlapping uplink periods. That is, the UE may borrow power allocated to one CC to transmit on an eCC. The UE may use a prioritization scheme to determine the transmit power for each CC. In some cases, the UE may send a power headroom report based on the power level of the eCC. The power headroom may be a virtual power headroom based on predicted eCC transmission power, or an actual power headroom based on uplink scheduling.

36 Claims, 18 Drawing Sheets

(58) Field of Classification Search
USPC ...... 455/522, 69, 452.1, 412, 311, 513, 509, 455/425; 370/328, 329, 412, 296, 335, 370/252, 315, 482, 485; 709/204, 227
See application file for complete search history.

(56) References Cited

U.S. PATENT DOCUMENTS

| | | | | |
|---|---|---|---|---|
| 2004/0042492 A1* | 3/2004 | Suzuki | ............... | H04B 7/2643 370/473 |
| 2006/0019672 A1* | 1/2006 | Kolding | ............... | H04W 52/34 455/452.2 |
| 2008/0310385 A1* | 12/2008 | Iochi | ............... | H04W 28/22 370/345 |
| 2011/0051643 A1* | 3/2011 | Hans | ............... | H04W 72/1263 370/311 |
| 2011/0111785 A1* | 5/2011 | Lindoff | ............... | H04W 40/16 455/513 |
| 2011/0211522 A1* | 9/2011 | Chung | ............... | H04L 1/1822 370/315 |
| 2011/0274092 A1* | 11/2011 | Liu | ............... | H04W 72/10 370/335 |
| 2012/0044882 A1* | 2/2012 | Kim | ............... | H04L 5/0058 370/329 |
| 2012/0082043 A1* | 4/2012 | Hwang | ............... | H04L 5/001 370/252 |
| 2012/0083264 A1* | 4/2012 | Ramasamy | ............... | H04W 52/262 455/425 |
| 2012/0087317 A1* | 4/2012 | Bostrom | ............... | H04W 52/30 370/329 |
| 2012/0113845 A1* | 5/2012 | Kim | ............... | H04L 5/0037 370/252 |
| 2012/0176979 A1* | 7/2012 | Kim | ............... | H04W 52/146 370/329 |
| 2012/0236735 A1* | 9/2012 | Nory | ............... | H04W 52/365 370/252 |
| 2013/0039289 A1* | 2/2013 | Lee | ............... | H04W 52/367 370/329 |
| 2013/0182661 A1* | 7/2013 | Piipponen | ............... | H04W 72/0473 370/329 |
| 2013/0250889 A1* | 9/2013 | Kim | ............... | H04L 5/001 370/329 |
| 2014/0362832 A1* | 12/2014 | Rudolf | ............... | H04L 1/1822 370/336 |
| 2015/0036566 A1 | 2/2015 | Blankenship et al. | | |
| 2015/0092637 A1* | 4/2015 | Yang | ............... | H04B 7/2656 370/296 |
| 2015/0188650 A1* | 7/2015 | Au | ............... | H04J 3/1694 370/312 |
| 2015/0208358 A1* | 7/2015 | Ahn | ............... | H04W 52/146 455/522 |
| 2015/0215877 A1* | 7/2015 | Ahn | ............... | H04W 72/0413 455/522 |
| 2015/0280882 A1* | 10/2015 | Lee | ............... | H04L 5/0053 370/329 |
| 2015/0341870 A1* | 11/2015 | Kim | ............... | H04W 52/367 370/329 |
| 2016/0007299 A1* | 1/2016 | Konuskan | ............... | H04W 52/16 455/522 |
| 2016/0095139 A1* | 3/2016 | Ding | ............... | H04W 74/04 370/329 |
| 2016/0119948 A1* | 4/2016 | Damnjanovic | ............... | H04L 1/1812 370/280 |
| 2016/0174161 A1* | 6/2016 | Seo | ............... | H04W 52/146 455/522 |
| 2016/0205631 A1* | 7/2016 | Chen | ............... | H04W 52/04 455/522 |
| 2016/0205632 A1* | 7/2016 | Yi | ............... | H04W 52/146 455/522 |
| 2016/0302205 A1* | 10/2016 | Ji | ............... | H04W 72/0473 |

OTHER PUBLICATIONS

ISA/EP, International Search Report and Written Opinion of the International Searching Authority, Int'l Application No. PCT/US2016/018492, Sep. 1, 2016, European Patent Office, Rijswijk, NL, 22 pgs.

* cited by examiner

POWER CONTROL AND POWER HEADROOM FOR COMPONENT CARRIER

CROSS REFERENCES

The present Application for Patent claims priority to U.S. Provisional Patent Application No. 62/121,942 by Vajapeyam et al., entitled "Power Control And Power Headroom For ECC," filed Feb. 27, 2015, assigned to the assignee hereof, and expressly incorporated by reference herein.

BACKGROUND

The following relates generally to wireless communication, and more specifically to power control and power headroom for enhanced component carriers (eCCs). Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless communication systems, a wireless communication device may communicate with a base station using carriers associated with different timing configurations; for instance, uplink transmissions may be asynchronous. The device may receive power control information from the base station indicating the transmit power for each carrier and may adjust transmit power allocations accordingly. In some cases, the control information from the base station may arrive before all of the carriers are scheduled. The device may thus allocate power according to information associated with an outdated uplink schedule, which may result in inefficient power transmit levels.

SUMMARY

A user equipment (UE) may coordinate total power utilization across different component carriers (CCs), each of which may have a different transmission time interval (TTI) configuration. The UE may receive transmit power information from a base station and determine power allocations accordingly. In some examples, the UE may reserve a portion of the total transmit power for a CC with a reduced TTI length (e.g., an enhanced CC (eCC)). In other examples, the UE may dynamically allocate transmit power between CCs based on overlapping uplink periods. For example, the UE may borrow (e.g., reallocate) transmit power from one CC to use for an eCC when both the CC and eCC transmitting. The UE may use a prioritization scheme to determine the transmit power for each CC. In some cases, the UE may send a power headroom report to the base station based on the power level of an eCC. The power headroom may be a virtual power headroom based on predicted eCC transmission power, or an actual power headroom based on received scheduling grants.

A method of wireless communication is described. The method may include receiving a carrier aggregation configuration comprising a first carrier with a first TTI length, a second carrier with a second TTI length different from the first TTI length, and a power control configuration, selecting a first transmission power level for the first carrier during a first TTI of the first TTI length, selecting a second transmission power level for the second carrier during a second TTI of the second TTI length, wherein the first TTI overlaps the second TTI and the second transmission power level is based at least in part on the power control configuration and the first transmission power level, transmitting on the first carrier based at least in part on the first transmission power level and transmitting on the second carrier based at least in part on the second transmission power level.

An apparatus for wireless communication is described. The apparatus may include means for receiving a carrier aggregation configuration comprising a first carrier with a first TTI length, a second carrier with a second TTI length different from the first TTI length, and a power control configuration, means for selecting a first transmission power level for the first carrier during a first TTI of the first TTI length, means for selecting a second transmission power level for the second carrier during a second TTI of the second TTI length, wherein the first TTI overlaps the second TTI and the second transmission power level is based at least in part on the power control configuration and the first transmission power level, means for transmitting on the first carrier based at least in part on the first transmission power level and means for transmitting on the second carrier based at least in part on the second transmission power level.

A further apparatus is described. The apparatus may include a processor, memory in electronic communication with the processor, and instructions stored in the memory. The instructions may be operable to cause the processor to receive a carrier aggregation configuration comprising a first carrier with a first TTI length, a second carrier with a second TTI length different from the first TTI length, and a power control configuration, select a first transmission power level for the first carrier during a first TTI of the first TTI length, select a second transmission power level for the second carrier during a second TTI of the second TTI length, wherein the first TTI overlaps the second TTI and the second transmission power level is based at least in part on the power control configuration and the first transmission power level, transmit on the first carrier based at least in part on the first transmission power level and transmit on the second carrier based at least in part on the second transmission power level.

A non-transitory computer readable medium for wireless communication is described. The non-transitory computer-readable medium may include instructions to cause a processor to receive a carrier aggregation configuration comprising a first carrier with a first TTI length, a second carrier with a second TTI length different from the first TTI length, and a power control configuration, select a first transmission power level for the first carrier during a first TTI of the first TTI length, select a second transmission power level for the second carrier during a second TTI of the second TTI length, where the first TTI overlaps the second TTI and the second transmission power level is based on the power control configuration and the first transmission power level, transmit on the first carrier based on the first transmission power level and transmit on the second carrier based on the second transmission power level.

In some examples of the method, apparatus, or non-transitory computer-readable medium described above, selecting the first transmission power level comprises: reducing a transmission power level for the first carrier based on the power control configuration.

Some examples of the method, apparatus, or non-transitory computer-readable medium described above may further include processes, features, means, or instructions for identifying a reserved power level for the second carrier, where reducing the transmission power level for the first carrier is based on the reserved power level.

In some examples of the method, apparatus, or non-transitory computer-readable medium described above, the second transmission power level is selected based on utilizing power made available by reducing the transmission power level for the first carrier.

In some examples of the method, apparatus, or non-transitory computer-readable medium described above, reducing the transmission power level for the first carrier comprises: selecting a transmission power level for the first carrier during at least one symbol period of the first TTI that is different from a transmission power level for the first carrier during at least one second symbol period of the first TTI, where the transmission power level for the first carrier during the at least one symbol period is based on the power control configuration and the transmission power level for the second carrier during the second TTI.

Some examples of the method, apparatus, or non-transitory computer-readable medium described above may further include processes, features, means, or instructions for identifying a set of prioritization rules based on information in a transmission, information layer, signal type, or any combination thereof, where the power control configuration is based on the set of prioritization rules.

In some examples of the method, apparatus, or non-transitory computer-readable medium described above, the set of prioritization rules comprises a rule prioritizing symbols containing uplink control information (UCI) on a primary cell (PCell), a rule prioritizing PCell demodulation reference signal (DM-RS) transmissions over physical uplink shared channel (PUSCH) enhanced component carrier (eCC) symbols, or a rule prioritizing eCC PUSCH symbols over PCell sounding reference signal (SRS) transmissions.

In some examples of the method, apparatus, or non-transitory computer-readable medium described above, the first TTI is a Long Term Evolution (LTE) subframe and the second TTI is an LTE symbol period.

In some examples of the method, apparatus, or non-transitory computer-readable medium described above, the power control configuration is based on a traffic type or a traffic volume on the second carrier.

A method of wireless communication is described. The method may include receiving a carrier aggregation configuration comprising a first carrier with a first TTI length, a second carrier with a second TTI length different from the first TTI length, and a power headroom reporting configuration, identifying a power level for the second carrier and transmitting a power headroom report for the second carrier based at least in part on the identified power level and the power headroom reporting configuration.

An apparatus for wireless communication is described. The apparatus may include means for receiving a carrier aggregation configuration comprising a first carrier with a first TTI length, a second carrier with a second TTI length different from the first TTI length, and a power headroom reporting configuration, means for identifying a power level for the second carrier and means for transmitting a power headroom report for the second carrier based at least in part on the identified power level and the power headroom reporting configuration.

A further apparatus is described. The apparatus may include a processor, memory in electronic communication with the processor, and instructions stored in the memory. The instructions may be operable to cause the processor to receive a carrier aggregation configuration comprising a first carrier with a first TTI length, a second carrier with a second TTI length different from the first TTI length, and a power headroom reporting configuration, identify a power level for the second carrier and transmit a power headroom report for the second carrier based at least in part on the identified power level and the power headroom reporting configuration.

A non-transitory computer readable medium for wireless communication is described. The non-transitory computer-readable medium may include instructions to cause a processor to receive a carrier aggregation configuration comprising a first carrier with a first TTI length, a second carrier with a second TTI length different from the first TTI length, and a power headroom reporting configuration, identify a power level for the second carrier and transmit a power headroom report for the second carrier based on the identified power level and the power headroom reporting configuration.

In some examples of the method, apparatus, or non-transitory computer-readable medium described above, the identified power level is a virtual power level.

In some examples of the method, apparatus, or non-transitory computer-readable medium described above, the identified power level is based on an uplink (UL) grant for the second carrier.

Some examples of the method, apparatus, or non-transitory computer-readable medium described above may further include processes, features, means, or instructions for selecting a power headroom report format from a set of power headroom formats of the power headroom reporting configuration, where transmitting the power headroom report is based on the selected power headroom format.

In some examples of the method, apparatus, or non-transitory computer-readable medium described above, the set of power headroom formats comprises at least one first format based on a virtual power level and at least one second format based on a UL grant.

A method of wireless communication is described. The method may include determining a carrier aggregation configuration for a wireless device comprising a first carrier with a first TTI length and second carrier with a second TTI length different from the first TTI length, determining a power control configuration for the wireless device based at least in part on the first carrier and the second carrier, determining a set of prioritization rules based at least in part on information in a transmission, information layer, signal type, or any combination thereof, wherein determining the power control configuration is based at least in part on the set of prioritization rules and scheduling a transmission for the wireless device based at least in part on the set of prioritization rules.

An apparatus for wireless communication is described. The apparatus may include means for determining a carrier aggregation configuration for a wireless device comprising a first carrier with a first TTI length and second carrier with a second TTI length different from the first TTI length, means for determining a power control configuration for the wireless device based at least in part on the first carrier and the second carrier, means for determining a set of prioritization rules based at least in part on information in a transmission, information layer, signal type, or any combination thereof, wherein determining the power control configuration is based at least in part on the set of prioritization rules and means for scheduling a transmission for the wireless device based at least in part on the set of prioritization rules.

A further apparatus is described. The apparatus may include a processor, memory in electronic communication with the processor, and instructions stored in the memory. The instructions may be operable to cause the processor to determine a carrier aggregation configuration for a wireless device comprising a first carrier with a first TTI length and second carrier with a second TTI length different from the first TTI length, determine a power control configuration for the wireless device based at least in part on the first carrier and the second carrier, determine a set of prioritization rules based at least in part on information in a transmission, information layer, signal type, or any combination thereof, wherein determining the power control configuration is based at least in part on the set of prioritization rules and schedule a transmission for the wireless device based at least in part on the set of prioritization rules.

A non-transitory computer readable medium for wireless communication is described. The non-transitory computer-readable medium may include instructions to cause a processor to determine a carrier aggregation configuration for a wireless device comprising a first carrier with a first TTI length and second carrier with a second TTI length different from the first TTI length, determine a power control configuration for the wireless device based on the first carrier and the second carrier, determine a set of prioritization rules based on information in a transmission, information layer, signal type, or any combination thereof, where determining the power control configuration is based on the set of prioritization rules and schedule a transmission for the wireless device based on the set of prioritization rules.

In some examples of the method, apparatus, or non-transitory computer-readable medium described above, the set of prioritization rules comprises a rule prioritizing symbols containing UCI on a PCell, a rule prioritizing PCell DM-RS transmissions over PUSCH eCC symbols, or a rule prioritizing eCC PUSCH symbols over PCell SRS transmissions.

In some examples of the method, apparatus, or non-transitory computer-readable medium described above, the power control configuration is based on a traffic type or a traffic volume on the second carrier.

A method of wireless communication is described. The method may include determining a carrier aggregation configuration comprising a first carrier with a first TTI length and second carrier with a second TTI length different from the first TTI length, configuring a wireless device with a power headroom reporting configuration comprising at least one first format based at least in part on a virtual power level, at least one second format based at least in part on a UL grant, or both and receiving a power headroom report based at least in part on the power headroom reporting configuration.

An apparatus for wireless communication is described. The apparatus may include means for determining a carrier aggregation configuration comprising a first carrier with a first TTI length and second carrier with a second TTI length different from the first TTI length, means for configuring a wireless device with a power headroom reporting configuration comprising at least one first format based at least in part on a virtual power level, at least one second format based at least in part on a UL grant, or both and means for receiving a power headroom report based at least in part on the power headroom reporting configuration.

A further apparatus is described. The apparatus may include a processor, memory in electronic communication with the processor, and instructions stored in the memory. The instructions may be operable to cause the processor to determine a carrier aggregation configuration comprising a first carrier with a first TTI length and second carrier with a second TTI length different from the first TTI length, configure a wireless device with a power headroom reporting configuration comprising at least one first format based at least in part on a virtual power level, at least one second format based at least in part on a UL grant, or both and receive a power headroom report based at least in part on the power headroom reporting configuration.

A non-transitory computer readable medium for wireless communication is described. The non-transitory computer-readable medium may include instructions to cause a processor to determine a carrier aggregation configuration comprising a first carrier with a first TTI length and second carrier with a second TTI length different from the first TTI length, configure a wireless device with a power headroom reporting configuration comprising at least one first format based on a virtual power level, at least one second format based on a UL grant, or both and receive a power headroom report based on the power headroom reporting configuration.

BRIEF DESCRIPTION OF THE DRAWINGS

The disclosure may be understood by reference to the following drawings.

DETAILED DESCRIPTION

According to the present disclosure, a user equipment (UE) configured with component carriers (CCs) having different timing configurations may utilize a joint power control configuration to allocate power among different CCs. Aspects of the disclosure, including examples of carrier aggregation (CA) power configurations for asynchronous CCs and enhanced CCs (eCCs), are described in the context of a wireless communication system. For instance, a user equipment (UE) may dynamically determine and adjust the transmit power of CCs with different timing configurations. This may enable the UE to efficiently allocate power to ensure certain quality of service (QoS) standards, regardless of unanticipated overlapping uplink grants. The UE may determine the transmit power configurations based on base station power control information or priority information, in various examples. Additionally, some of the described examples illustrate power headroom reporting configurations for scenarios in which a UE may be unaware of the actual transmit power levels associated with a report. These and other aspects of the disclosure are illustrated by and described with reference to apparatus diagrams, system diagrams, and flowcharts associated with power control and power headroom reporting for CA with an eCC.

Figure 1:
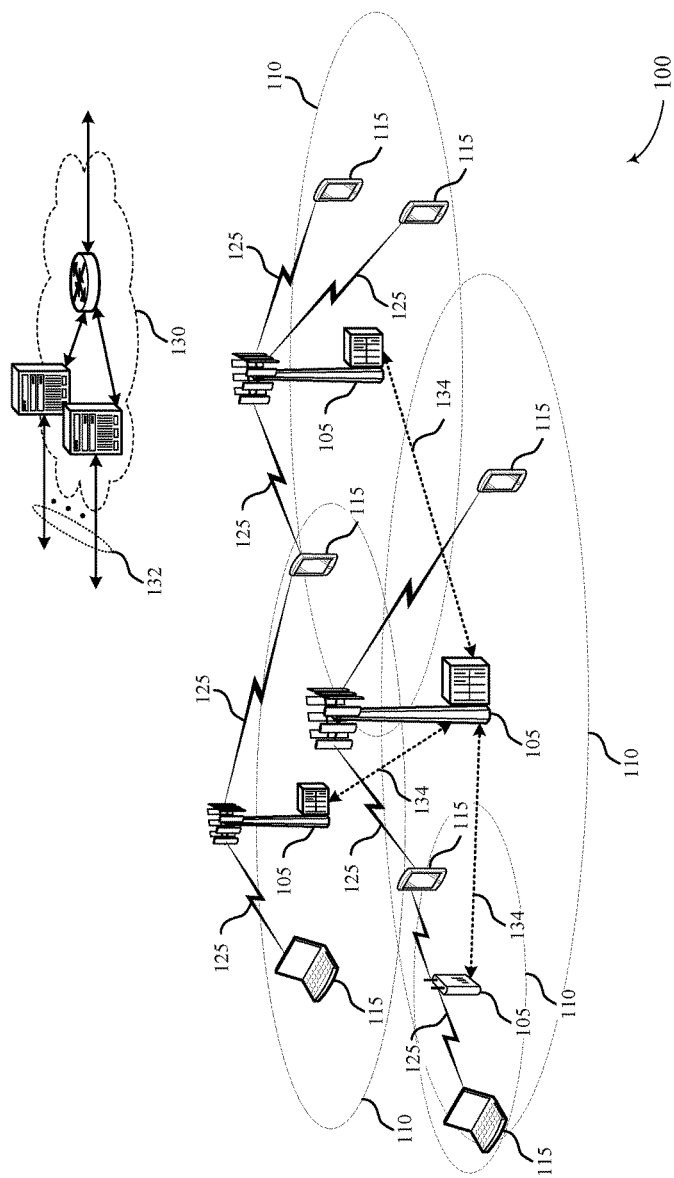
FIG. 1 illustrates an example of a wireless communications system that supports power control and power headroom reporting for carrier aggregation (CA) with an enhanced component carrier (eCC) in accordance with various aspects of the present disclosure.

FIG. 1 illustrates an example of a wireless communications system 100 that supports power control and power headroom reporting for CA with an eCC in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support, and may communicate with one another to support power control and power headroom reporting for eCCs. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as evolved NodeBs (eNBs) 105, in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support power control and power headroom reporting for CA with an eCC.

Base stations 105 and UEs 115 may communicate using carriers, which may also be referred to as CCs, layers, channels, etc. The term "component carrier" or CC may refer to each of the multiple carriers utilized by a UE in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). PCells may be semi-statically configured by higher layers (e.g., radio resource control (RRC), etc.) on a per-UE basis. Certain uplink control information (UCI), e.g., acknowledgement (ACK)/negative acknowledgment (NACK), channel quality indicator (CQI), and scheduling information transmitted on a physical uplink control channel (PUCCH), are carried by the PCell. Additional carriers may be designated as secondary carriers, or secondary component carriers (SCC), which may be served by secondary cells (SCells). Secondary cells may likewise be semi-statically configured on a per-UE basis. In some cases, SCells may not include or be configured to transmit the same control information as the PCell.

In some cases, wireless communications system 100 may utilize one or more eCCs. An SCell may, for instance, be an eCC. An eCC may be characterized by one or more features including: flexible bandwidth, different transmission time interval (TTIs), and modified control channel configuration. In some cases, an eCC may be associated with a CA configuration or a dual connectivity configuration (i.e., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a variable TTI length, which may include use of a reduced or variable symbol duration. In some cases, the symbol duration may remain the same, but each symbol may represent a distinct TTI. An eCC may, in some examples, include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information, as described below.

A UE 115 may coordinate transmit power with a serving base station to mitigate interference, improve the UL data rate, and prolong battery life. Uplink power control may include a combination of open-loop and closed-loop mechanisms. In open-loop power control, the UE transmit power may depend on estimates of the downlink path-loss and channel configuration. In closed-loop power control, the network may directly control the UE transmit power using explicit power-control commands. Open-loop power control may be used for initial access, whereas both open and closed loop control may be used for UL control and data transmission. A UE 115 may determine transmit power using an algorithm that takes into account a maximum transmission power limit, a target base station receive power, path loss, modulation and coding scheme (MCS), the number of resources used for transmission, and the format of the transmitted data (e.g., physical UL control channel (PUCCH) format). Power adjustments may be made by a base station 105 using a transmit power command (TPC) messages, which may incrementally adjust the transmit power of a UE 115 as appropriate for various situations. A UE 115 may send power headroom reports to indicate the difference between the actual transmit power and the maximum transmit power.

In a CA context, a UE 115 may calculate a total transmit power and then allocate the power among one or more CCs. The power allocation may be made semi-statically or when UL grants are received for each CC. If some CCs have different TTI lengths (e.g., if one CC is an eCC), an UL grant for one CC may be received after power has already been allocated to another CC. In this case, power may be "borrowed" from one CC for use on the other. That is, power allocated to one CC may be dynamically reallocated to another CC. This may occur even if the UE 115 is transmitting on both CCs simultaneously. The decision to borrow power may be based on a prioritization of different CCs and transmission types.

Figure 2:
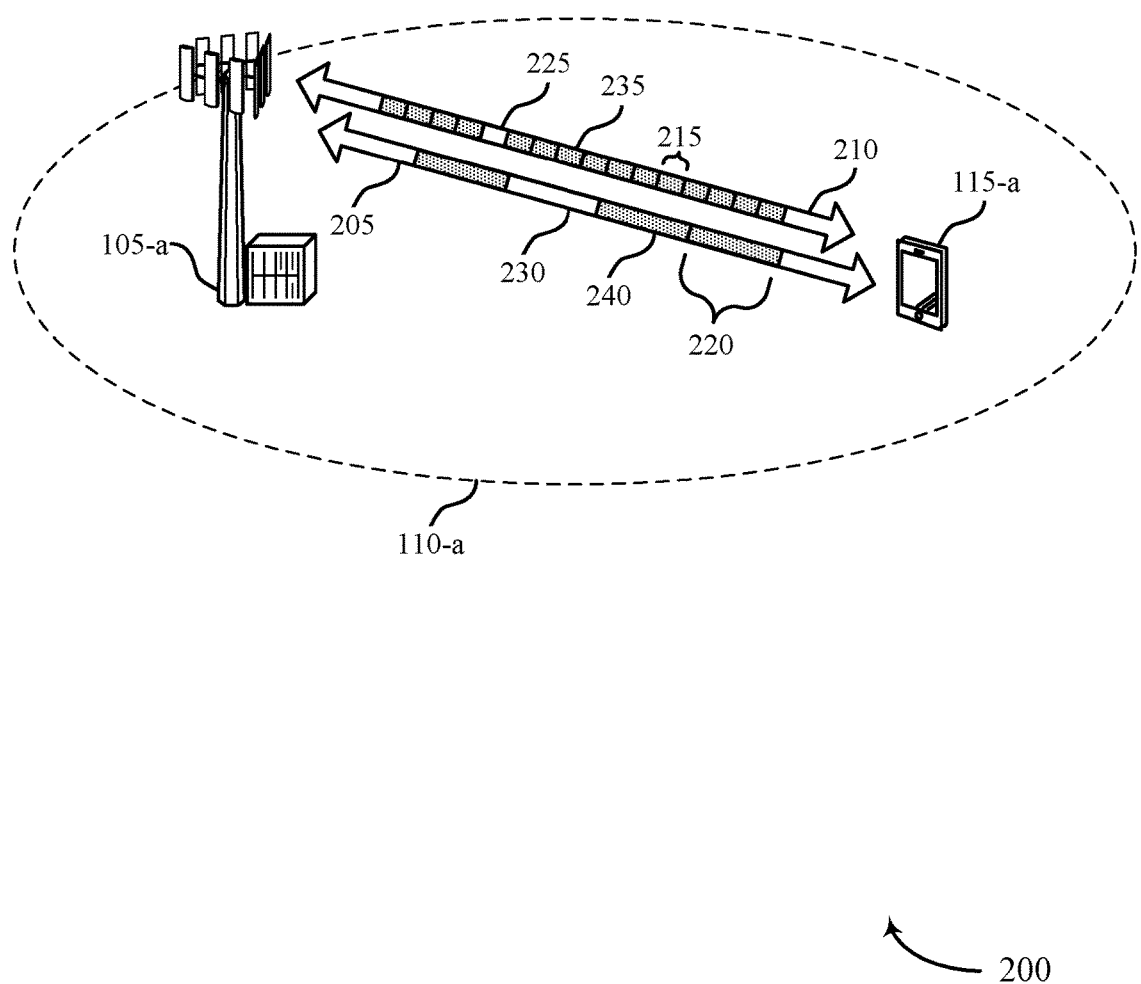
FIG. 2 illustrates an example of a wireless communications system that supports power control and power headroom reporting for CA with an eCC in accordance with various aspects of the present disclosure.

FIG. 2 illustrates an example of a wireless communications system 200 that supports power control and power headroom reporting for CA with an eCC in accordance with various aspects of the present disclosure. Wireless communications system 200 may provide power control for uplink transmissions by CCs with different timing configurations. The power control may be dynamically determined in order to provide efficient allocation of transmit power to CCs regardless of scheduling latencies and asynchronous uplink bursts. Wireless communications system 200 may include UE 115-a and a base station 105-a which may be examples of devices described herein, and with reference to FIG. 1.

Base station 105-a may communicate (e.g., using CA) with any UE 115 within coverage area 110-a. For example, base station 105-a may exchange data and control information with UE 105-a via CCs such as PCell 205 and an eCC SCell 210. In some cases, eCC SCell 210 may include TTIs that are shorter in duration than those associated with PCell 205. For example, eCC SCell TTI 215 may be an LTE symbol period and PCell TTI 220 may be an LTE subframe (e.g., 1 ms in duration). UE 115-a may receive information from base station 105-a in downlink eCC SCell TTIs 225 and downlink PCell TTIs 230. UE 115-a may send information to base station 105-a in uplink eCC SCell TTIs 235 and uplink PCell TTIs 240. Uplink eCC SCell TTIs 235 and uplink PCell TTIs 240 may be scheduled and transmitted asynchronously (e.g., the TTI boundaries may not be aligned). A group of contiguous eCC SCell 210, or PCell 205, TTIs may be called a burst.

In some scenarios, base station 105-a may send power control information to UE 115-a, which may include a maximum (or minimum) transmit power UE 115-a may use for an uplink. The power control may be in the form of incremental TPC messages. The power control information may be sent using PCell 205 or eCC SCell 210. In some cases, the power control information may include maximum transmit power indication for individual CCs (e.g., transmit power ceilings for PCell 205 and eCC SCell 210). Accordingly, UE 115-a may determine the power allocation for cells based on information provided by base station 105-a, or may determine the allocation among CCs independently. For example, UE 115-a may allocate (reserve) a different amount of power for eCC SCell 210 uplink transmissions than for PCell 205 uplink transmissions in accordance with the indicated power constraints from base station 105-a. In another example, UE 115-a may borrow (e.g., reallocate) power allocated to PCell 205 for UL transmissions on eCC SCell 210.

Power may be borrowed based on a prioritization scheme for different types of transmissions. In some examples, the set of prioritization rules include a rule prioritizing symbols containing uplink control information (UCI) on a PCell. In some examples, the set of prioritization rules includes a rule prioritizing PCell demodulation reference signal (DM-RS) transmissions over physical uplink shared channel (PUSCH) eCC symbols. In some examples, the set of prioritization rules includes a rule prioritizing eCC PUSCH symbols over PCell sounding reference signal (SRS) transmissions.

The base station 105-a may schedule eCC SCell 210 and PCell 205 for asynchronous uplink transmissions. For example, base station 105-a may schedule PCell 205 independent of scheduling eCC SCell 210. Accordingly, uplink PCell TTIs 240 and uplink eCC SCell TTIs 235 may overlap and may or may not be aligned (i.e., UE 115-a may transmit on eCC SCell 235 and PCell 240 at different times). Base station 105-a may schedule resources for an uplink transmission in UL grants to UE 115-a. In some cases, an uplink grant may be conveyed by the same carrier as the scheduled resources (i.e., PCell 205 may convey uplink grants associated with PCell 205 resources and eCC SCell 210 may convey uplink grants associated with eCC SCell 210 resources). The latency associated with uplink grants may be less for eCC SCell 210 than for PCell 205 due to the reduced TTI length. Thus, an uplink eCC SCell TTI 235 may be scheduled and transmitted with a faster turn-around than an uplink PCell TTI 240.

In some cases UE 115-a may determine the difference between the maximum transmit power and the power requested by base station 105-a and report the difference in a power headroom report (PHR). The PHR may be sent using either PCell 205 or eCC SCell 210. The PHR may be transmitted according to a prompt from base station 105-a, or independently as determined by UE 115-a. In some cases, the PHR may be sent periodically, according to a schedule set by UE 115-a or base station 105-a. In other cases, UE 115-a may send a PHR based on a change in a communication conditions, such as when path loss between UE 115-a and base station 105-a exceeds a threshold. In some scenarios, a combination of periodic and aperiodic PHRs may be implemented.

Figure 3:
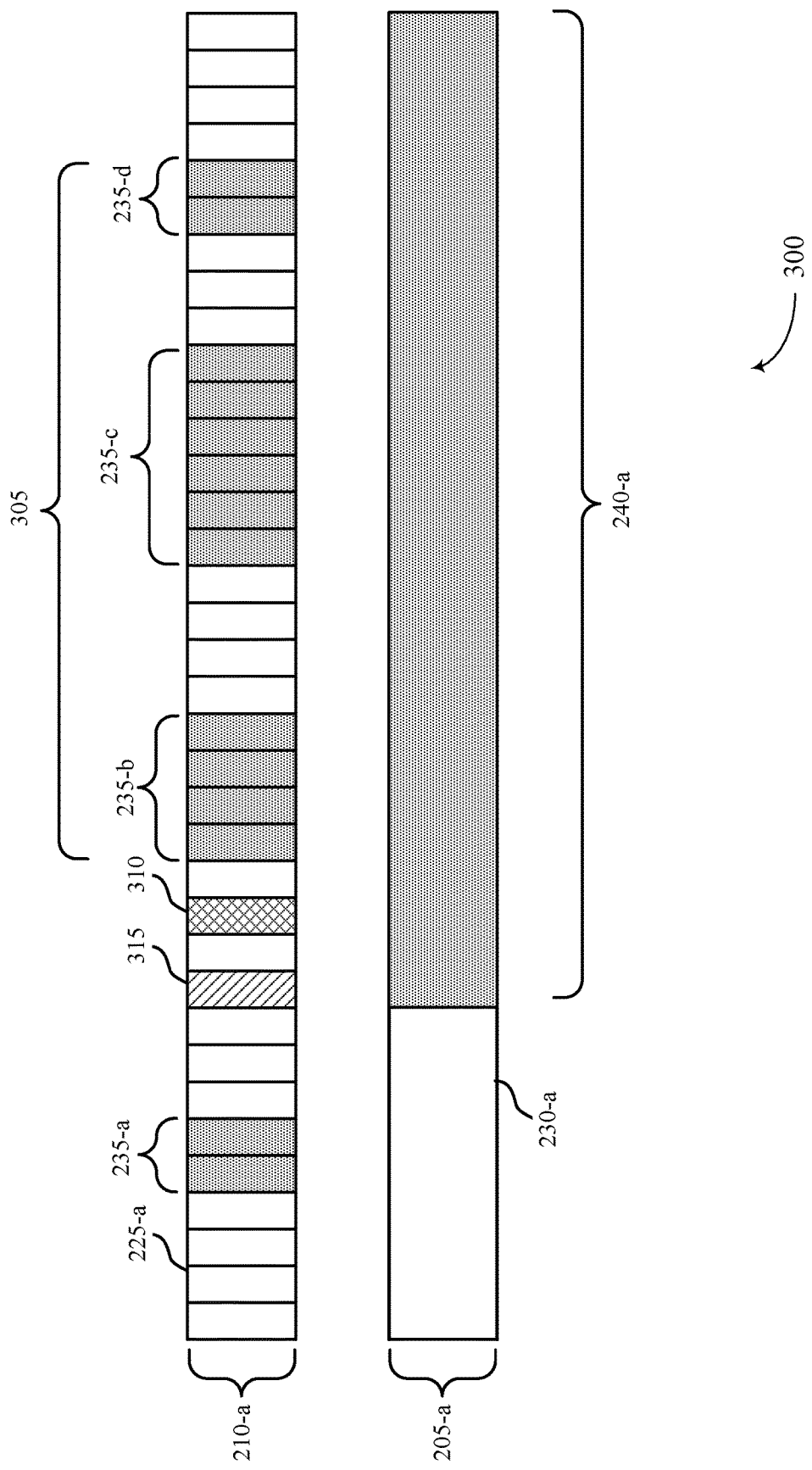
FIGS. 3-4 illustrate examples of eCC timing configurations in systems that support power control and power headroom reporting for CA with an eCC in accordance with various aspects of the present disclosure.

FIG. 3 illustrates an example of a eCC timing configuration 300 for power control and power headroom reporting for CA within an eCC in accordance with various aspects of the present disclosure. The eCC timing configuration 300 may represent an example in which an amount of power is reserved for use on an eCC. Power may be semi-statically allocated to ensure quality of service (QoS) standards for CCs that use varying timing configurations (e.g, different length TTIs). The eCC timing configuration 300 may be used for power controlled communications between a UE 115 and a base station 105 as described with reference to FIGS. 1 and 2. The eCC timing configuration 300 may include PCell 205-a and eCC SCell 210-a, which may perform the operations described herein with reference to FIGS. 1 and 2. In certain examples, eCC SCell 210 may be an eCC SCell that includes short TTIs (i.e., eCC SCell 210-a TTIs may be shorter in duration than PCell 205-a TTIs). eCC timing configuration 300 may also include uplink eCC SCell burst 235-a, which may overlap with downlink PCell TTI 230-a.

The eCC timing configuration 300 may include downlink eCC SCell TTIs 225-a and downlink PCell TTIs 230-a, which may convey data and control (e.g., uplink grants) from a base station 105 to a UE 115. For example, a base station 105 may send uplink grant 310 scheduling uplink eCC SCell burst 235-b. Uplink eCC SCell bursts 235-c, 235-d may also be scheduled by respective uplink grants (not shown). A base station 105 may asynchronously schedule resources for CCs such that uplink TTIs for different CCs overlap. For example, overlap period 305 may include uplink eCC SCell bursts 235-b, 235-c, 235-d which are scheduled during uplink PCell TTI 240-a. Accordingly, PCell TTI 240-a may be said to overlap the TTIs of eCC SCell bursts 235-b, 235-c, and 235-d.

In some cases, downlink PCell TTIs 230-a may include power control information. For example, a PCell 205-a transmission may reserve a predetermined amount of power for eCC SCell 210-a uplink transmissions. In such scenarios, reserving a minimum amount of power (e.g., power not used for PCell 205-a transmissions) may prevent the eCC SCell 210-a transmission from falling below a minimum quality of service (QoS). In some cases, the reserved transmit power level for eCC SCell 210-a may be configured as a fraction of the total power associated with UE 115. The transmit power reservation may be based on eCC SCell 210-a traffic or the number of cells configured. In other instances, eCC SCell 210-a may convey power control information. For example, the leading eCC SCell TTI 315 corresponding to uplink PCell TTI 240-a may include power control information such as transmit power floor or ceiling. In some cases, a base station 105 may transmit power control information to a UE 115 prior to in conjunction with the scheduling of uplink grants.

The eCC timing configuration 300 may also include uplink PCell TTI 240-a, which may be scheduled in a grant conveyed by a previous downlink PCell 205-a TTI (e.g., downlink PCell TTI 230-a). Due to the short duration of eCC SCell 210-a TTIs, an eCC SCell 210-a uplink grant (e.g., uplink grant 310) and associated uplink transmissions (e.g., uplink eCC SCell bursts 235-b, 235-c, 235-d) may occur within a single PCell 205-a TTI. Accordingly, a UE 115-a may not be able to predict overlaps between uplink PCell 205-a TTIs and uplink eCC SCell 210-a TTIs because the eCC SCell uplink grant may occur during a PCell 205-a TTI. Thus, a UE 115 may be configured to allocate power reserves to each CC separately.

In some cases, the UE 115 may limit transmissions on each CC to the power limit for that CC. However, the UE 115 may alter or modify the transmit powers for PCell 205-a and eCC SCell 210-a during or between uplink transmissions. The modifications may be determined in compliance with the power control indicated by base station 105-a. In some cases, the transmit power of PCell 205-a may be scheduled beforehand and the transmit power of eCC SCell 210-a may be modified or adjusted. That is, uplink PCell TTI 240-a may be utilize a power level based on a predetermined transmit power. In some cases, eCC timing configuration 300 may include one or more additional eCC SCells 210. The eCC SCells 210 may support the same timing configuration as PCell 205-a, eCC SCell 210-a, or some other timing configuration. A base station 105 and UE 115 may incorporate the additional eCC SCells 210 into the power control scheme described herein.

Figure 4:
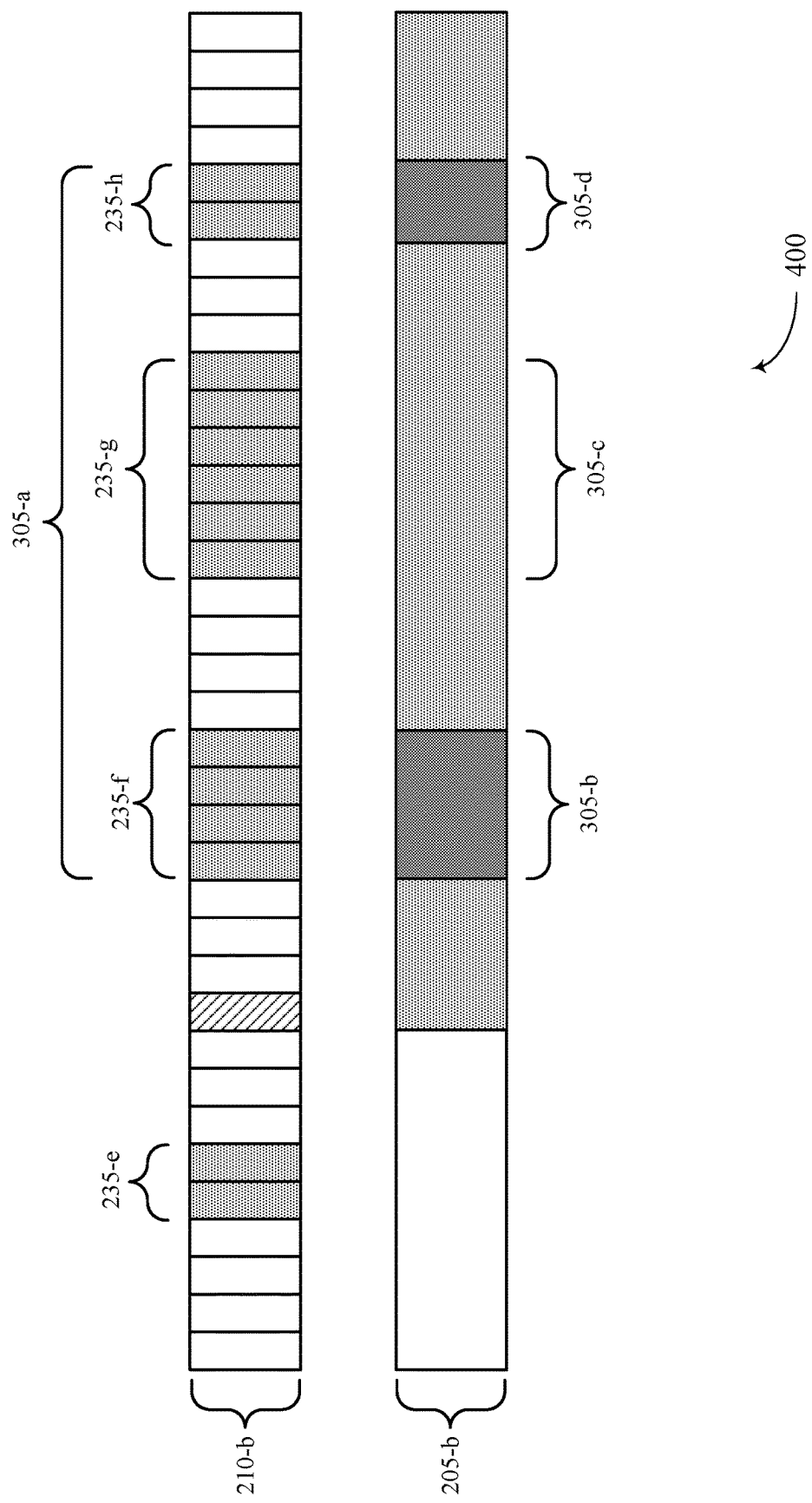

FIG. 4 illustrates an example of an eCC timing configuration 400 for power control and power headroom reporting for CA within an eCC in accordance with various aspects of the present disclosure. The eCC timing configuration 400 may illustrate an example of borrowing power for eCC transmissions associated with unanticipated, asynchronous uplink overlaps to efficiently allocate power to the CC with higher priority data. This may tend to ensure a minimum QoS on the eCC. The eCC timing configuration 300 may be used for power controlled communications between a UE 115 and a base station 105. The eCC timing configuration 400 may include PCell 205-b and eCC SCell 210-b which may perform the operations described herein with reference to FIGS. 1-3. The eCC timing configuration 400 may include overlap period 305-a, which includes unanticipated uplink transmissions on both eCC SCell 210-b and PCell 205-b.

A UE 115 may actively manage transmit power for CCs at the eCC SCell 210-b TTI-level. That is, the transmit power level for an eCC SCell 210-b TTI may be different for different TTIs. In some examples, the transmit power for a CC may vary within a TTI (e.g., within uplink PCell TTI 240-b). In some cases, a UE 115 may transmit eCC SCell 210-b using a portion of the power allocated for PCell 205-b. That is, a UE 115 may use power adjustments within a TTI on PCell 205-b to supply additional power to eCC SCell 210-b (e.g., an eCC SCell 210-b transmission may borrow power from PCell 205-b when the UE 115 is power limited). Power borrowing may be based on uplink overlaps between the CCs. For instance, the UE 115 may decrease transmit power for PCell 205-b during overlap periods 305-b, 305-d, while simultaneously increasing the transmit power for corresponding uplink eCC SCell bursts 235-*f*, 235-*h*. The UE 115 may refrain from borrowing power during overlap period 305-*c* based on the content of the associated transmissions.

A UE 115 may adjust the transmit power of CCs within a single PCell 205-*b* TTI. For instance, PCell 205-*a* may transmit with an initial power based on a power control configuration. However, when an overlapping eCC SCell 210-*b* burst is scheduled for uplink, the UE 115 may decrease the power level of PCell 205-*b* and boost the transmission power of eCC SCell 210-*b* for the eCC SCell 210-*b* burst. In some cases, the decrease in transmit power on PCell 205-*b* may be the same as the increase in transmit power on eCC SCell 210-*b*. The transmit power of eCC SCell 210-*b* bursts within overlap period 305-*a* may be the same or different (e.g., uplink eCC SCell burst 235-*f* may have a different transmit power than that of uplink eCC SCell burst 235-*g*). The transmit power of eCC SCell 210-*b* bursts within overlap period 305-*a* may be the same or different from that of eCC SCell 210-*b* bursts outside of overlap period 305-*a* (e.g., uplink eCC SCell burst 235-*h* may have different transmit power than that of uplink eCC SCell burst 235-*e*).

Thus, a UE 115 may dynamically modify power levels of CCs via redistribution of power. This redistribution may be based on priority. For example, a CC associated with a high priority may be transmitted using power allocated for a CC associated with a lower priority. The prioritization may be determined by the UE 115, or indicated in an uplink grant from the base station 105. For example, an eCC SCell 210-*b* uplink grant conveyed on PCell 205-*b* may include prioritization information. The prioritization may be based on information associated with a transmission such as data type, signal type, or information layer, etc. The prioritization may be dynamic or static. In some cases, the prioritization may change within a duration of a PCell 205-*b* TTI.

Figure 5:
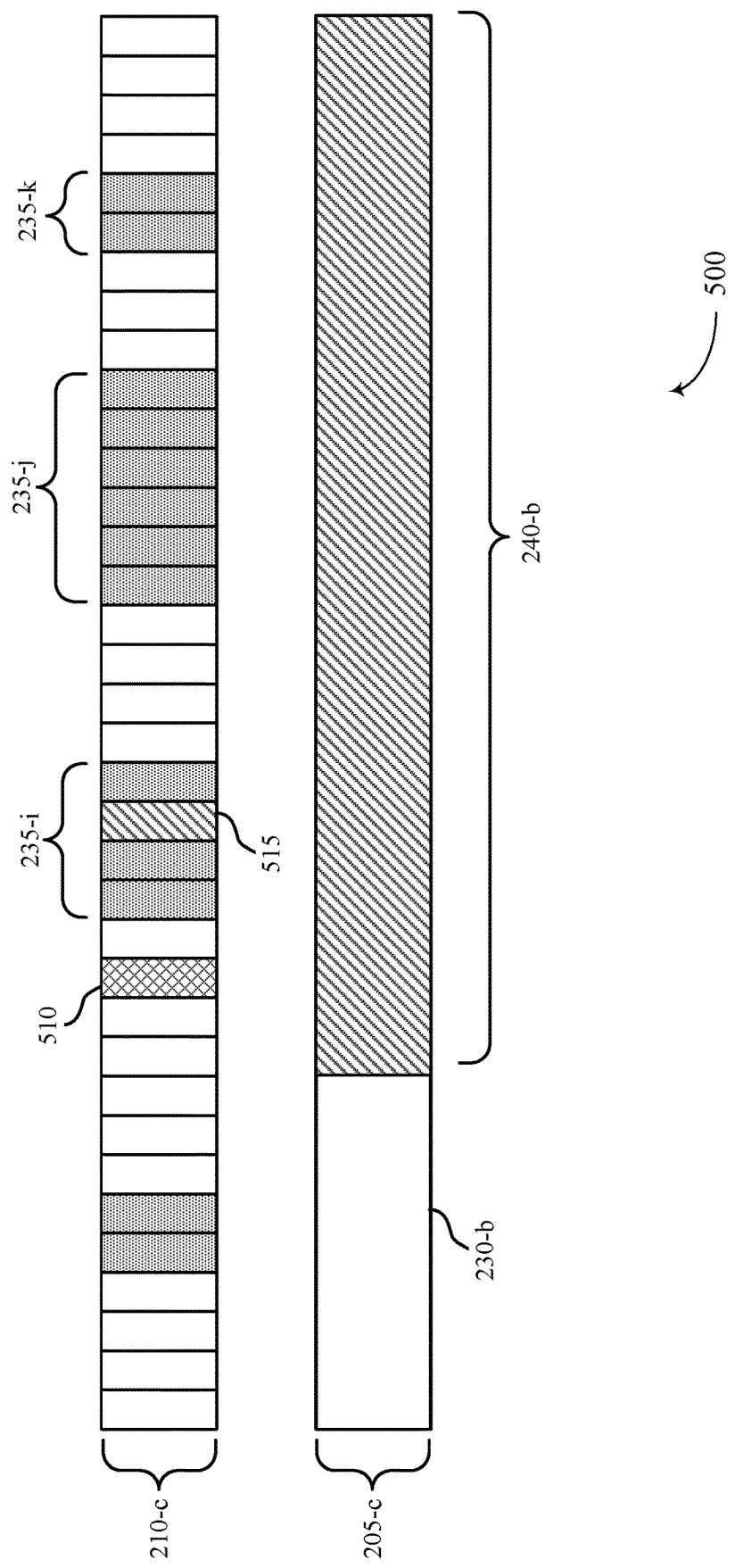
FIG. 5 illustrates an examples of a power headroom reporting configuration in systems that support power control and power headroom reporting for CA with an eCC in accordance with various aspects of the present disclosure.

FIG. 5 illustrates an example of a power headroom reporting configuration 500 for power control and power headroom reporting for CA with an eCC in accordance with various aspects of the present disclosure. Power head room reporting configuration 500 may allow a UE 115 to report headroom information before the UE 115 is made aware of the uplink schedule of the relevant CCs. Power headroom reporting configuration 500 may include PCell PHR which conveys power headroom for a UE 115. Power head room reporting configuration 500 may include PCell 205-*c* and eCC SCell 210-*c* which may perform the operations described herein with reference to FIGS. 1-4.

In some cases, a base station 105 may schedule a UE 115 to report power headroom (i.e., the transmission power available for the UE 115 to use based on the current transmission). In other cases, the UE 115 may send a PHR independently. For example, the UE 115 may transmit PHRs periodically or upon a change in communication conditions (e.g., when an eCC SCell is activated, when a path loss to a base station 105 changes, or when a timer expires). The UE 115 may determine when to send a PHR based on information from the base station 105. In some cases, the UE 115 may be scheduled to report power headroom on PCell 205-*c*. For example, the UE 115 may be scheduled to transmit during PCell TTI 240-*b*.

In some cases, the UE 115 may not know the power headroom associated with uplink PCell TTI 240-*b* due to the low latency scheduling of eCC SCell 210-*c*. That is, a PHR conveyed on PCell 205-*c* may not include actual power headroom for eCC SCell 210-*c* in the same PCell 205-*c* TTI. For example, the UE 115 may receive an uplink grant 510 for eCC SCell TTIs 235-*i*, 235-*j*, 235-*k* during PCell TTI 240-*b*. Thus, the UE 115 may transmit a PHR before uplink eCC SCell TTIs 235-*i*, 235-*j*, 235-*k* have been scheduled, which may result in an estimation of the transmit power available. In such instances, the UE 115 may send a virtual PHR. The virtual PHR may be based on a default value or may be dynamically determined by the UE 115 based on expected uplink transmissions. For example, the UE 115 may anticipate the power consumption during uplink PCell TTI 240-*b*. In some cases, the virtual power level may be based on cell history or configuration information from the base station 105. In some cases, PCell 205-*c* may include an uplink grant for eCC SCell 210-*c* on downlink PCell TTI 230-*b*. In such an instance, the UE 115 may report the actual power headroom.

In some cases, the UE 115 may report power headroom on eCC SCell 210-*c*. For example, uplink eCC SCell TTIs 235-*i* may include eCC SCell PHR 515. The eCC SCell PHR 515 may include power headroom associated with eCC SCell 210-*c* and PCell 205-*c*. The power headroom reported for PCell 205-*c* may be based on an actual power allocation if a PCell 205-*c* uplink transmission overlaps with the eCC SCell 210-*b* uplink. In an example including overlap, the UE 115 may store the PCell 205-*c* power headroom information when the UE 115 receives a grant associated with the PCell 205-*c* and send the PCell 205-*c* PHR using an eCC SCell 210-*c* grant. In some cases, UE 115 may switch between reporting actual and virtual headroom reports.

Figure 6:
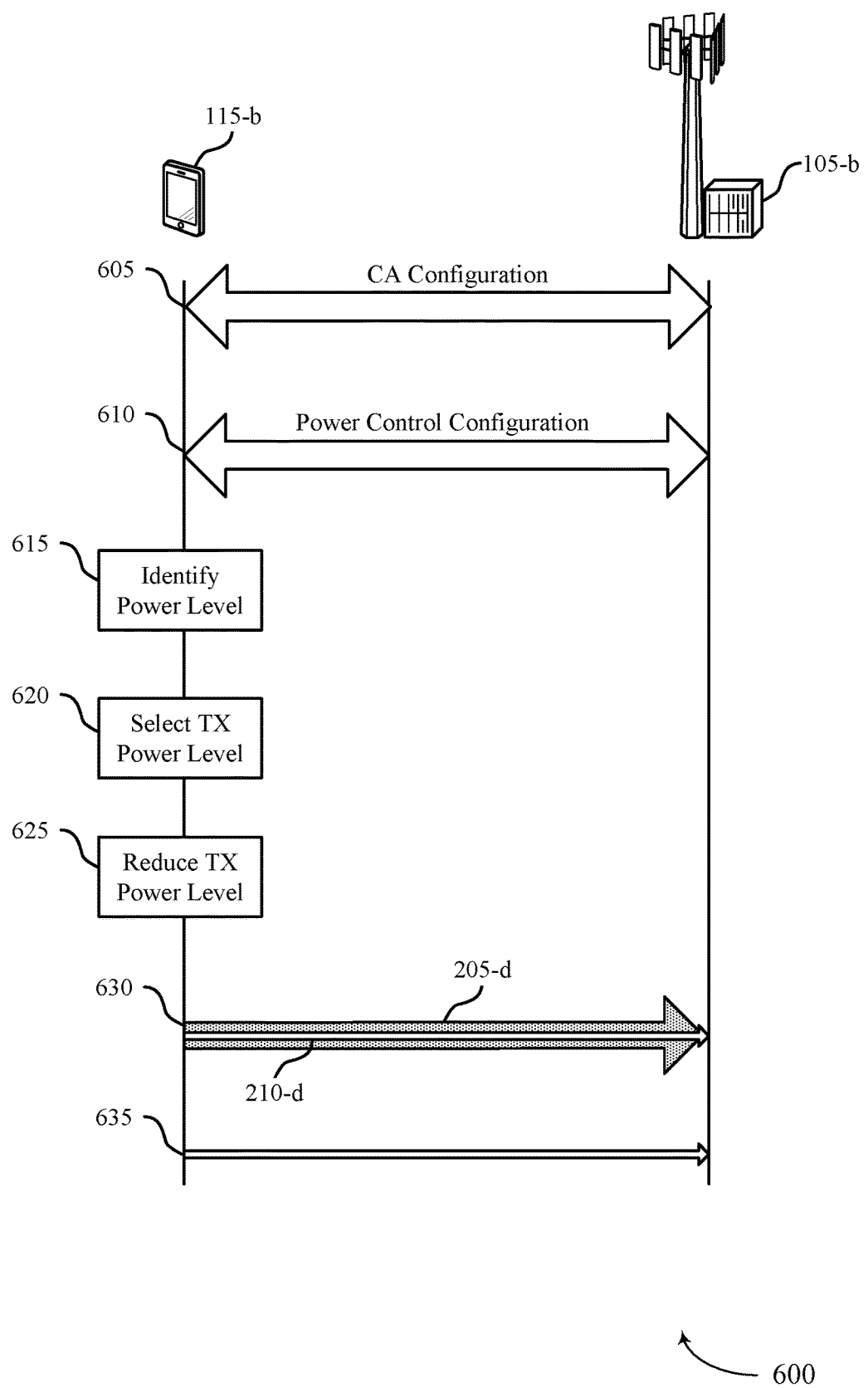
FIG. 6 illustrates an example of a process flow in systems that support power control and power headroom reporting for CA with an eCC in accordance with various aspects of the present disclosure.

FIG. 6 illustrates an example of a process flow 600 for power control and power headroom reporting for CA with an eCC in accordance with various aspects of the present disclosure. Process flow 600 may include UE 115-*b* and base station 105-*b* which may perform the operations described herein with reference to FIGS. 1-5. UE 115-*b*, or base station 105-*b*, may determine a CA configuration for communication with base station 105-*b*. The CA configuration may include a first carrier with a first TTI length and second carrier with a second TTI length different from (e.g., less than) the first TTI length. The CA may also include a power control configuration or a power headroom reporting configuration. In some examples, the first carrier is a PCell and the second carrier is an eCC cell. In some examples the first TTI is an LTE subframe and the second TTI is an LTE symbol period.

At 605, UE 115-*b* and base station 105-*b* may establish a CA configuration. In some examples, the CA configuration includes a configuration of a first CC (e.g., a PCell) using one TTI length and a second CC (e.g., an eCC SCell) using another TTI length. In some cases, base station 105-*b* may determine a CA configuration and a power control configuration for UE 115-*b*. In some examples, base station 105-*b* may determine a power headroom reporting configuration. Base station 105-*b* may also determine a set of prioritization rules based on information in a transmission, information layer, or signal type. Accordingly, determining the power control configuration may be based on the set of prioritization rules. In some examples, the power control configuration is based on a traffic type or a traffic volume on the second carrier.

At 610, UE 115-*b* and base station 105-*b* may establish a power control configuration. In some examples, UE 115-*b* may determine a power control configuration based on the first carrier and the second carrier. The power control configuration may, for instance, be based on a traffic type or a traffic volume on the second carrier. In some examples, base station 105-*b* may determine a power control configuration for the UE 115-*b*. In some cases, base station 105-*b* determines the power control configuration based on the first carrier and the second carrier. In some examples, base station 105-*b* may configure power control parameters for UE 115-*b* on the based on a set of prioritization rules At 615, UE 115-*b* may identify a power level for the second carrier. In some examples, the identified power level is a virtual power level. Additionally or alternatively, the identified power level may be based on an UL grant for the second carrier.

At 620, UE 115-*b* may select a transmission power level for the first carrier during a first TTI of the first TTI length. UE 115-*b* may also select a transmission power level for the second carrier during a second TTI of the second TTI length. The second TTI may be located within or occur during the first TTI; that is, the first TTI may overlap the second TTI. In certain instances, the transmission power level for the second carrier is based on the power control configuration and the transmission power level for the first carrier.

At 625, UE 115-*b* may reduce the transmission power level for the first carrier based on the power control configuration. In certain examples, UE 115-*b* may identify a reserved power level for the second carrier. Accordingly, reducing the transmission power level for the first carrier may be based on the reserved power level. In some examples, the transmission power level for the second carrier is selected based on utilizing power made available by reducing the transmission power level for the first carrier. In some examples, reducing the transmission power level for the first carrier includes selecting a transmission power level for the first carrier during at least one symbol period of the first TTI that is less than a transmission power level for the first carrier during at least one second symbol period of the first TTI. The transmission power level for the first carrier during the at least one symbol period may be based on the power control configuration and the transmission power level for the second carrier during the second TTI.

In some instances, UE 115-*b* may identify a set of prioritization rules based on information relating to a transmission, information layer, or signal type. Accordingly, determining the power control configuration may be based on the set of prioritization rules. In some examples, the set of prioritization rules include a rule prioritizing symbols containing uplink control information (UCI) on a PCell. In some examples, the set of prioritization rules includes a rule prioritizing PCell DM-RS transmissions over PUSCH eCC symbols. In some examples, the set of prioritization rules includes a rule prioritizing eCC PUSCH symbols over PCell SRS transmissions.

At 630, UE 115-*b* may transmit the first carrier 205-*d* and the second carrier 210-*d* according to the selected transmit powers. In some examples, the UE 115-*b* may transmit the first carrier 205-*d* based on or according to a first transmission power level (e.g., a reduced transmission power level). The UE 115-*b* may transmit the second carrier 205-*d* based on or according to a second transmission power level. In some examples, the second transmission power level may be based on the first transmission power level or power control information.

At 635, UE 115-*b* may transmit a PHR. The transmission may include a PHR for the second carrier. The PHR may be based on the identified power level for the second carrier. UE 115-*b* or base station 105-*b* may select the format of the PHR from a number of power headroom formats. The number of power headroom formats may be included in a power headroom reporting configuration. The power headroom reporting configurations may be determined or transmitted by the base station 10-5*b* to the UE 115-*b*. In some examples, the PHR is based on the power headroom format. In certain cases, the number of power headroom formats includes one first format based on a virtual power level and at least one second format based on an UL grant.

In certain instances, base station 105-*b* may configure a wireless device with a power headroom reporting configuration which includes at least one first format based on a virtual power level, at least one second format based on an UL grant, or both. Accordingly, base station 105-*b* may receive a PHR (e.g., from UE 115-*b*) based on the power headroom reporting configuration.

Figure 7:
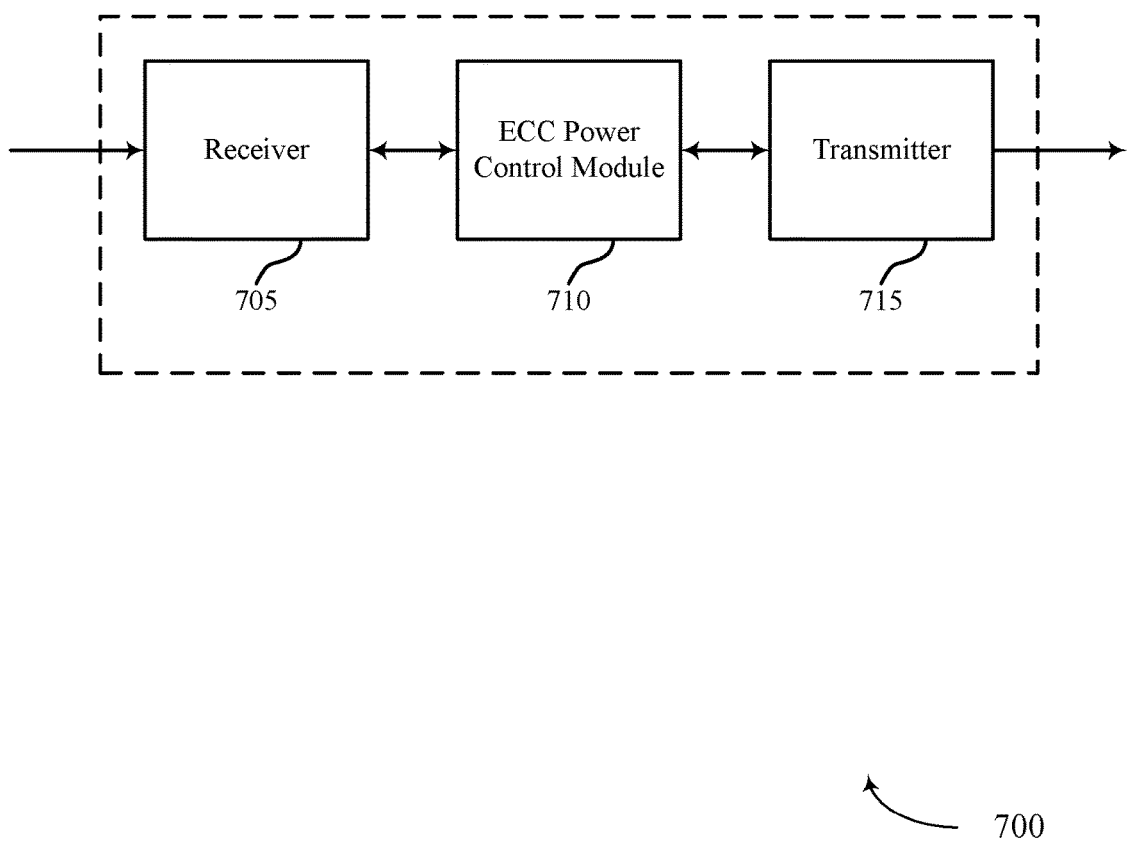
FIGS. 7-9 show block diagrams of a wireless device or devices that support power control and power headroom reporting for CA with an eCC in accordance with various aspects of the present disclosure.

FIG. 7 shows a block diagram of a wireless device 700 configured for power control and power headroom reporting for CA with an eCC in accordance with various aspects of the present disclosure. Wireless device 700 may be an example of aspects of a UE 115 described with reference to FIGS. 1-6. Wireless device 700 may include a receiver 705, an eCC power control module 710, or a transmitter 715. Wireless device 700 may also include a processor. Each of these components may be in communication with one another.

The receiver 705 may receive information such as packets, user data, or control information associated with various information channels (e.g., control channels, data channels, and information related to power control and power headroom in eCC, etc.). Information may be passed on to the eCC power control module 710, and to other components of wireless device 700.

The eCC power control module 710 may determine a CA configuration that includes a first carrier with a first TTI length and second carrier with a second TTI length less than the first TTI length. The CA configuration may include a power control configuration or a power headroom reporting configuration. The eCC power control module 710 may determine the power control configuration based on the first carrier and the second carrier. The eCC power control module 710 may also select a transmission power level for the first carrier during a first TTI of the first TTI length, and select a transmission power level for the second carrier during a second TTI of the second TTI length. The first TTI may overlap the second TTI. The transmission power level for the second carrier may be based on the power control configuration and the transmission power level for the first carrier.

The transmitter 715 may transmit signals received from other components of wireless device 700. In some examples, the transmitter 715 may be collocated with the receiver 705 in a transceiver module. The transmitter 715 may include a single antenna, or may include a plurality of antennas. In some examples, the transmitter 715 may transmit the first carrier based on or according to a first transmission power level (e.g., a reduced transmission power level). The transmitter 715 may transmit the second carrier based on or according to a second transmission power level. In some examples, the second transmission power level may be based on the first transmission power level or power control information.

Figure 8:
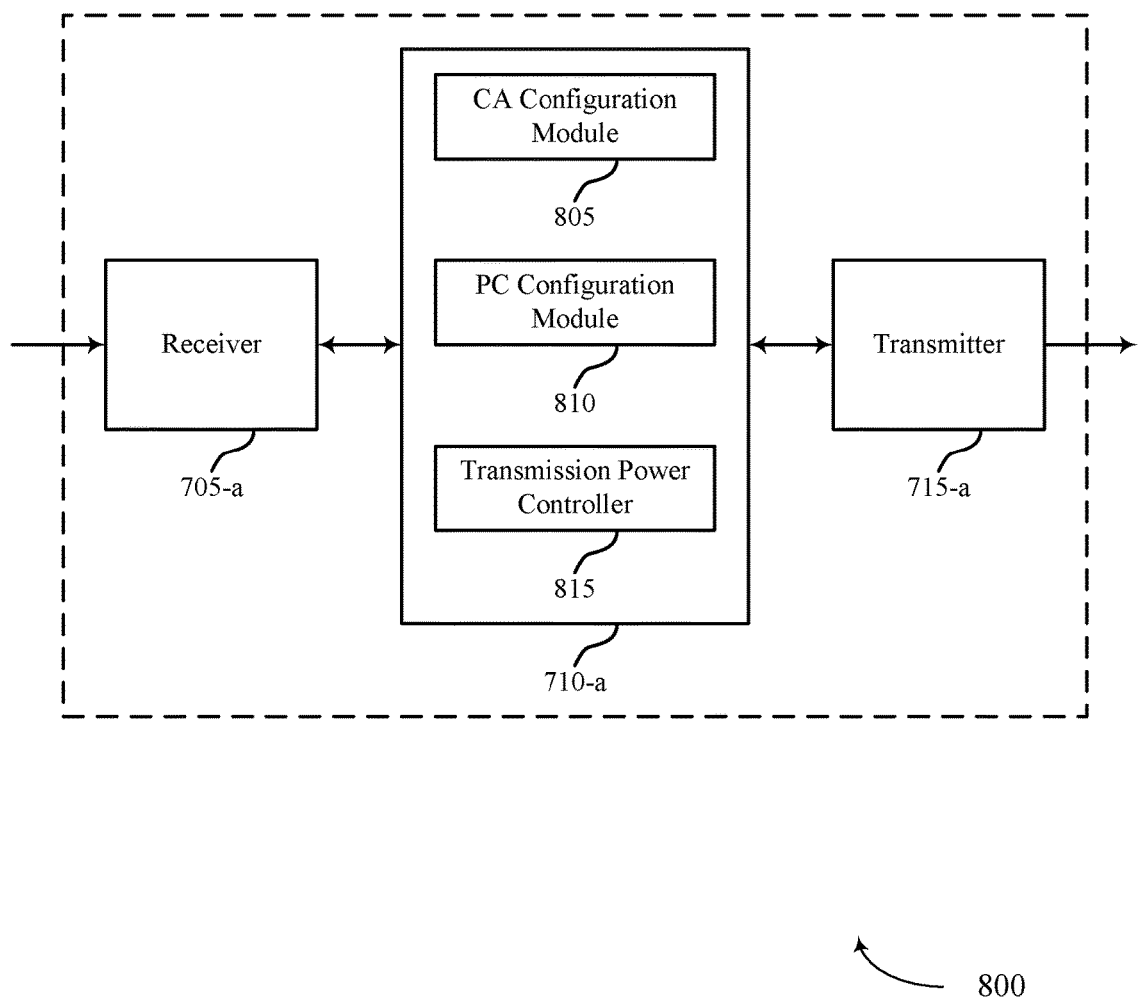

FIG. 8 shows a block diagram of a wireless device 800 for power control and power headroom reporting for CA with an eCC in accordance with various aspects of the present disclosure. Wireless device 800 may be an example of aspects of a wireless device 700 or a UE 115 described with reference to FIGS. 1-7. Wireless device 800 may include a receiver 705-*a*, an eCC power control module 710-*a*, or a transmitter 715-*a*. Wireless device 800 may also include a processor. Each of these components may be in communication with one another. The eCC power control module 710-*a* may also include a CA configuration module 805, a power control (PC) configuration module 810, and a transmission power controller 815.

The receiver 705-*a* may receive information which may be passed on to eCC power control module 710-*a*, and to other components of wireless device 800. The eCC power control module 710-*a* may perform the operations described herein with reference to FIG. 7. The transmitter 715-*a* may transmit signals received from other components of wireless device 800.

The CA configuration module 805 may determine a CA configuration that includes a first carrier with a first TTI length and second carrier with a second TTI length less than the first TTI length as described herein with reference to FIGS. 2-6. The CA configuration may include a power control configuration or a power headroom reporting configuration. In some examples, the first carrier may be a PCell and the second carrier may be an eCC cell. In some examples, the first TTI may be an LTE subframe and the second TTI may be an LTE symbol period.

The PC configuration module 810 may determine a power control configuration based on the first carrier and the second carrier as described herein with reference to FIGS. 2-6. In some examples, the power control configuration may be based on a traffic type or a traffic volume on the second carrier. The PC configuration module 810 may also identify a power level for the second carrier. In some examples, the identified power level may be based on an UL grant for the second carrier. In some examples, the power control configuration may be based on a traffic type or a traffic volume on the second carrier.

The transmission power controller 815 may select a transmission power level for the first carrier during a first TTI of the first TTI length as described herein with reference to FIGS. 2-6. The transmission power controller 815 may also select a transmission power level for the second carrier during a second TTI of the second TTI length. The first TTI may overlap the second TTI. The transmission power level for the second carrier may be based on the power control configuration and the transmission power level for the first carrier. In some examples, selecting the transmission power level for the first carrier includes reducing the transmission power level for the first carrier based on the power control configuration. In some examples, the transmission power level for the second carrier may be selected based on utilizing power made available by reducing the transmission power level for the first carrier.

Figure 9:
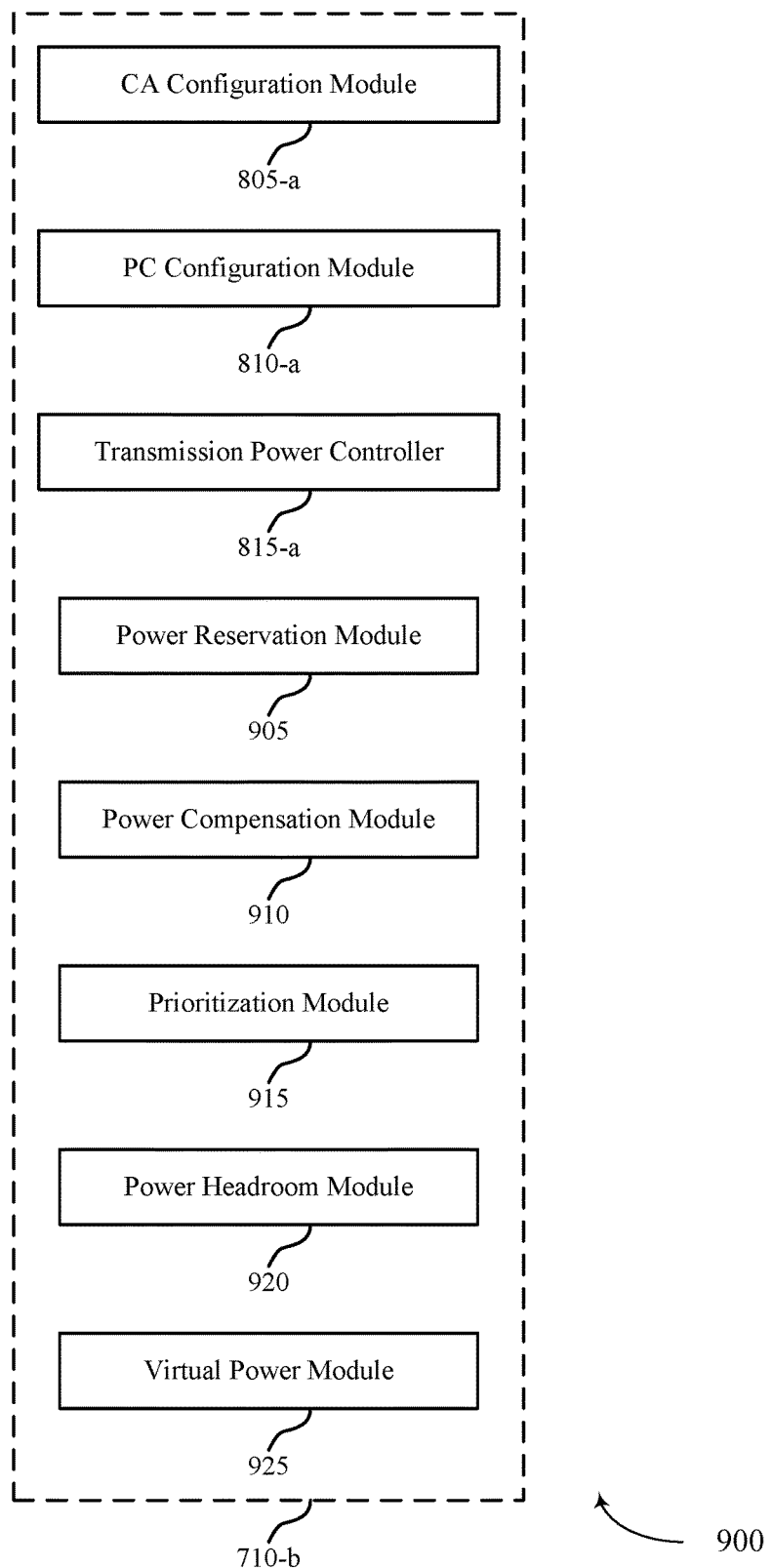

FIG. 9 shows a block diagram 900 of an eCC power control module 710-*b* which may be a component of a wireless device 700 or a wireless device 800 for power control and power headroom reporting for CA with an eCC in accordance with various aspects of the present disclosure. The eCC power control module 710-*b* may be an example of aspects of an eCC power control module 710 described with reference to FIGS. 7-8. The eCC power control module 710-*b* may include a CA configuration module 805-*a*, a PC configuration module 810-*a*, and a transmission power controller 815-*a*. Each of these modules may perform the functions described herein with reference to FIG. 8. The eCC power control module 710-*b* may also include a power reservation module 905, a power compensation module 910, a prioritization module 915, a power headroom module 920, and a virtual power module 925.

The power reservation module 905 may identify a reserved power level for the second carrier. Accordingly, reducing the transmission power level for the first carrier may be based on the reserved power level as described herein with reference to FIGS. 2-6.

The power compensation module 910 may be configured such that reducing the transmission power level for the first carrier may include selecting a transmission power level for the first carrier during at least one symbol period of the first TTI that may be less than a transmission power level for the first carrier during at least one second symbol period of the first TTI. The transmission power level for the first carrier during the at least one symbol period may be based on the power control configuration and the transmission power level for the second carrier during the second TTI as described herein with reference to FIGS. 2-6.

The prioritization module 915 may identify a set of prioritization rules based on information in a transmission, information layer, or signal type. Thus, determining the power control configuration may be based on the set of prioritization rules as described herein with reference to FIGS. 2-6. In some examples, the set of prioritization rules includes a rule prioritizing symbols containing UCI on a PCell. In some examples, the set of prioritization rules includes a rule prioritizing PCell DM-RS transmissions over PUSCH eCC symbols. In some examples, the set of prioritization rules includes a rule prioritizing eCC PUSCH symbols over PCell SRS transmissions.

The power headroom module 920 may transmit a power headroom report for the second carrier based on the identified power level as described herein with reference to FIGS. 2-6. The power headroom module 920 may also select a power headroom report format from a number of power headroom formats. In some cases, the power headroom report is based on the power headroom format. In some examples, the number of power headroom formats includes at least one first format based on a virtual power level and at least one second format based on an UL grant.

The virtual power module 925 may be configured such that the identified power level may be a virtual power level as described herein with reference to FIGS. 2-6.

Figure 10:
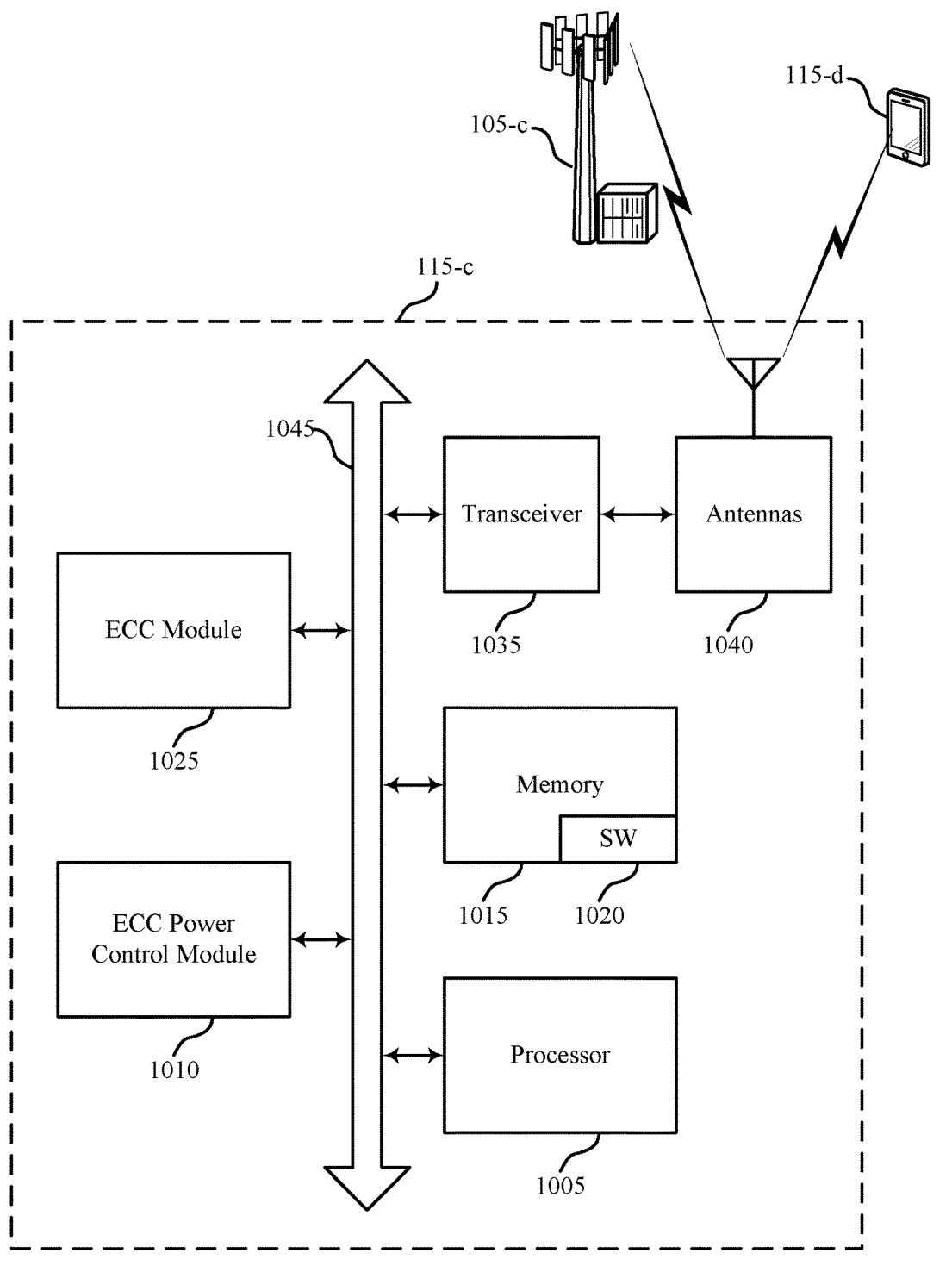
FIG. 10 illustrates a diagram of a system including a user equipment (UE) that supports power control and power headroom reporting for CA with an eCC in accordance with various aspects of the present disclosure.

FIG. 10 shows a diagram of a system 1000 including a UE 115 configured for power control and power headroom reporting for CA with an eCC in accordance with various aspects of the present disclosure. System 1000 may include UE 115-*c*, which may be an example of a wireless device 700, a wireless device 800, or a UE 115 described herein with reference to FIGS. 1, 2 and 7-9. UE 115-*c* may include an eCC power control module 1010, which may be an example of an eCC power control module 710 described with reference to FIGS. 7-9. UE 115-*c* may also include a eCC module 1025. UE 115-*c* may also include components for bi-directional voice and data communications including components for transmitting communications and components for receiving communications. For example, UE 115-*c* may communicate bi-directionally with base station 105-*c* or UE 115-*d*.

The eCC module 1025 may coordinate communications of the UE 115 over eCCs. For example, eCC module 1025 may enable communications based on features including: flexible bandwidth, variable length TTIs, and modified control channel configuration as described herein.

UE 115-*c* may also include a processor 1005, and memory 1015 (including software (SW) 1020), a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-c may include a single antenna 1040, UE 115-c may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., power control and power headroom in eCC, etc.). Alternatively, the software/firmware code 1020 may not be directly executable by the processor 1005 but cause a computer (e.g., when compiled and executed) to perform functions described herein. The processor 1005 may include an intelligent hardware device (e.g., a central processing unit (CPU), a microcontroller, an application-specific integrated circuit (ASIC), etc.).

Figure 11:
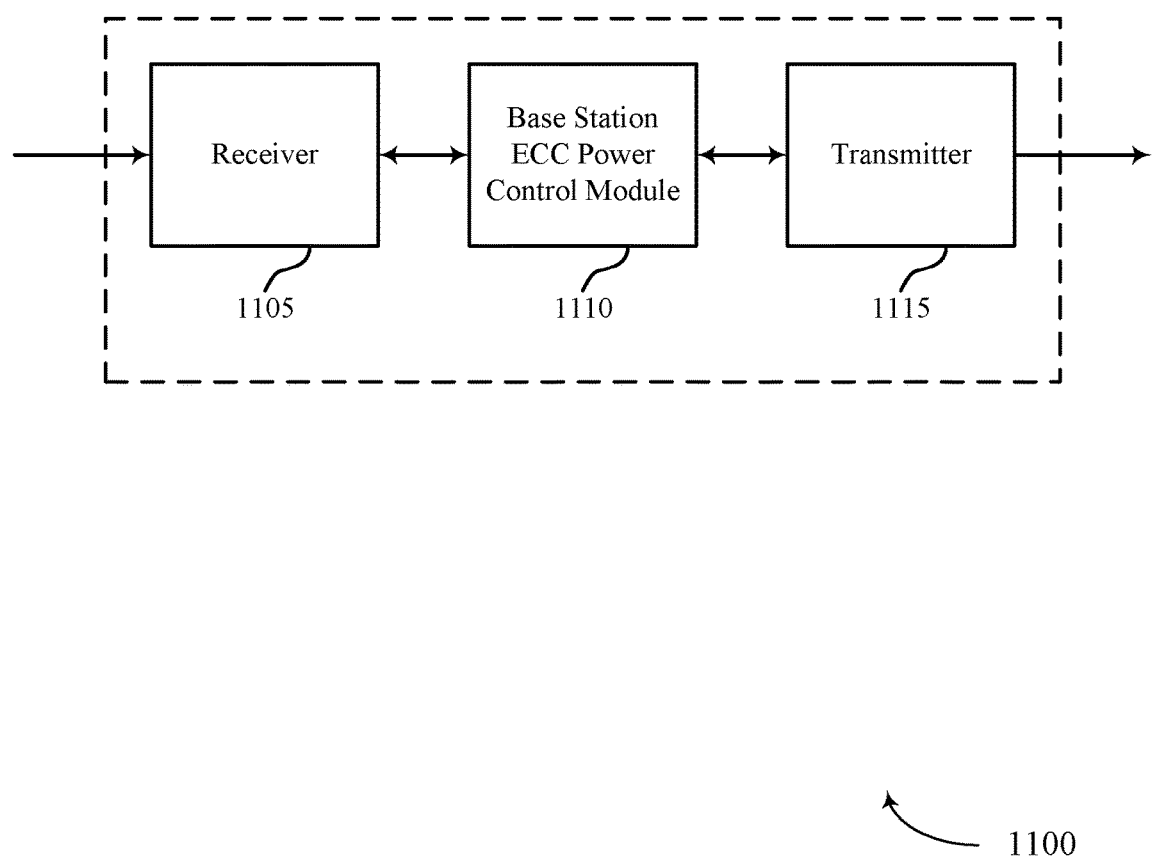
FIGS. 11-13 show block diagrams of a wireless device or devices that support power control and power headroom reporting for CA with an eCC in accordance with various aspects of the present disclosure.

FIG. 11 shows a block diagram of a wireless device 1100 configured for power control and power headroom reporting for CA with an eCC in accordance with various aspects of the present disclosure. Wireless device 1100 may be an example of aspects of a base station 105 described with reference to FIGS. 1-10. Wireless device 1100 may include a receiver 1105, a base station eCC power control module 1110, or a transmitter 1115. Wireless device 1100 may also include a processor. Each of these components may be in communication with one another.

The receiver 1105 may receive information such as packets, user data, or control information associated with various information channels (e.g., control channels, data channels, and information related to power control and power headroom in eCC, etc.). Information may be passed on to the base station eCC power control module 1110, and to other components of wireless device 1100. In some examples, the receiver 1105 may receive a PHR based on the power headroom reporting configuration.

The base station eCC power control module 1110 may determine a carrier aggregation configuration for a wireless device that includes a first carrier with a first TTI length and second carrier with a second TTI length less than the first TTI length. The base station eCC power control module 1110 may determine a power control configuration for the wireless device based on the first carrier and the second carrier. The base station eCC power control module 1110 determine a set of prioritization rules based on information in a transmission, information layer, or signal type. Thus, determining the power control configuration may be based on the set of prioritization rules. The base station eCC power control module 1110 may also schedule a transmission for the wireless device on the based on the prioritization rules.

The transmitter 1115 may transmit signals received from other components of wireless device 1100. In some examples, the transmitter 1115 may be collocated with the receiver 1105 in a transceiver module. The transmitter 1115 may include a single antenna, or may include a plurality of antennas.

Figure 12:
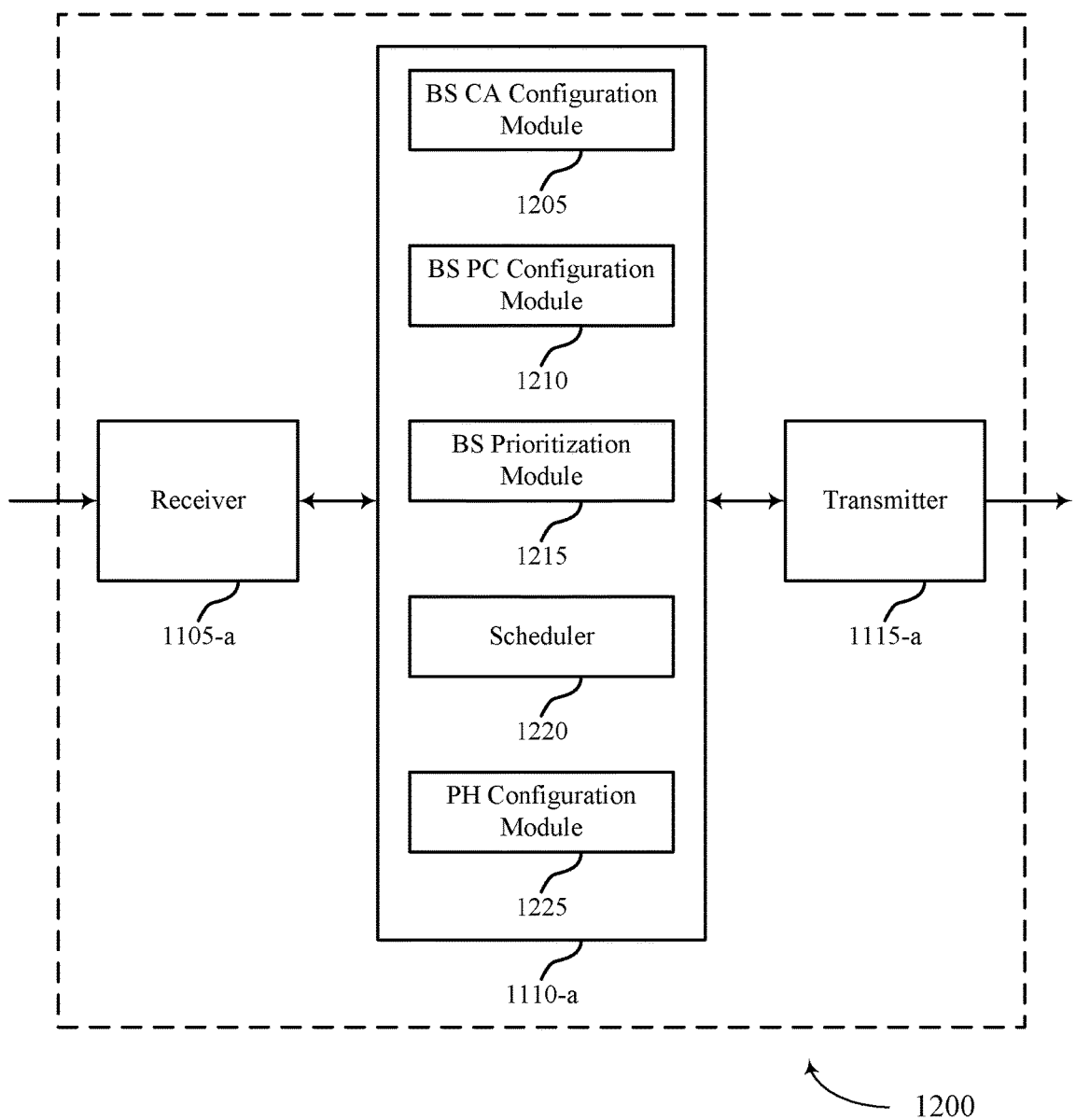

FIG. 12 shows a block diagram of a wireless device 1200 for power control and power headroom reporting for CA with an eCC in accordance with various aspects of the present disclosure. Wireless device 1200 may be an example of aspects of a wireless device 1100 or a base station 105 described with reference to FIGS. 1-11. Wireless device 1200 may include a receiver 1105-a, a base station eCC power control module 1110-a, or a transmitter 1115-a. Wireless device 1200 may also include a processor. Each of these components may be in communication with one another. The base station eCC power control module 1110-a may also include a base station (BS) CA configuration module 1205, a BS PC configuration module 1210, a BS prioritization module 1215, a scheduler 1220, and a PH (power headroom) configuration module 1225.

The receiver 1105-a may receive information which may be passed on to base station eCC power control module 1110-a, and to other components of wireless device 1200. The base station eCC power control module 1110-a may perform the operations described herein with reference to FIG. 11. The transmitter 1115-a may transmit signals received from other components of wireless device 1200.

The BS CA configuration module 1205 may determine a CA configuration for a wireless device that includes a first carrier with a first TTI length and second carrier with a second TTI length different from (e.g., less than) the first TTI length as described herein with reference to FIGS. 2-6.

The BS PC configuration module 1210 may determine a power control configuration for the wireless device based on the first carrier and the second carrier as described herein with reference to FIGS. 2-6.

The BS prioritization module 1215 may determine a set of prioritization rules based on information in a transmission, information layer, or signal type. Accordingly, determining the power control configuration may be based on the set of prioritization rules as described herein with reference to FIGS. 2-6.

The scheduler 1220 may schedule a transmission for the wireless device on the based on the prioritization rules as described herein with reference to FIGS. 2-6.

The PH configuration module 1225 may configure a wireless device with a power headroom reporting configuration including at least one first format based on a virtual power level, at least one second format based on an UL grant, or both as described herein with reference to FIGS. 2-6.

Figure 13:
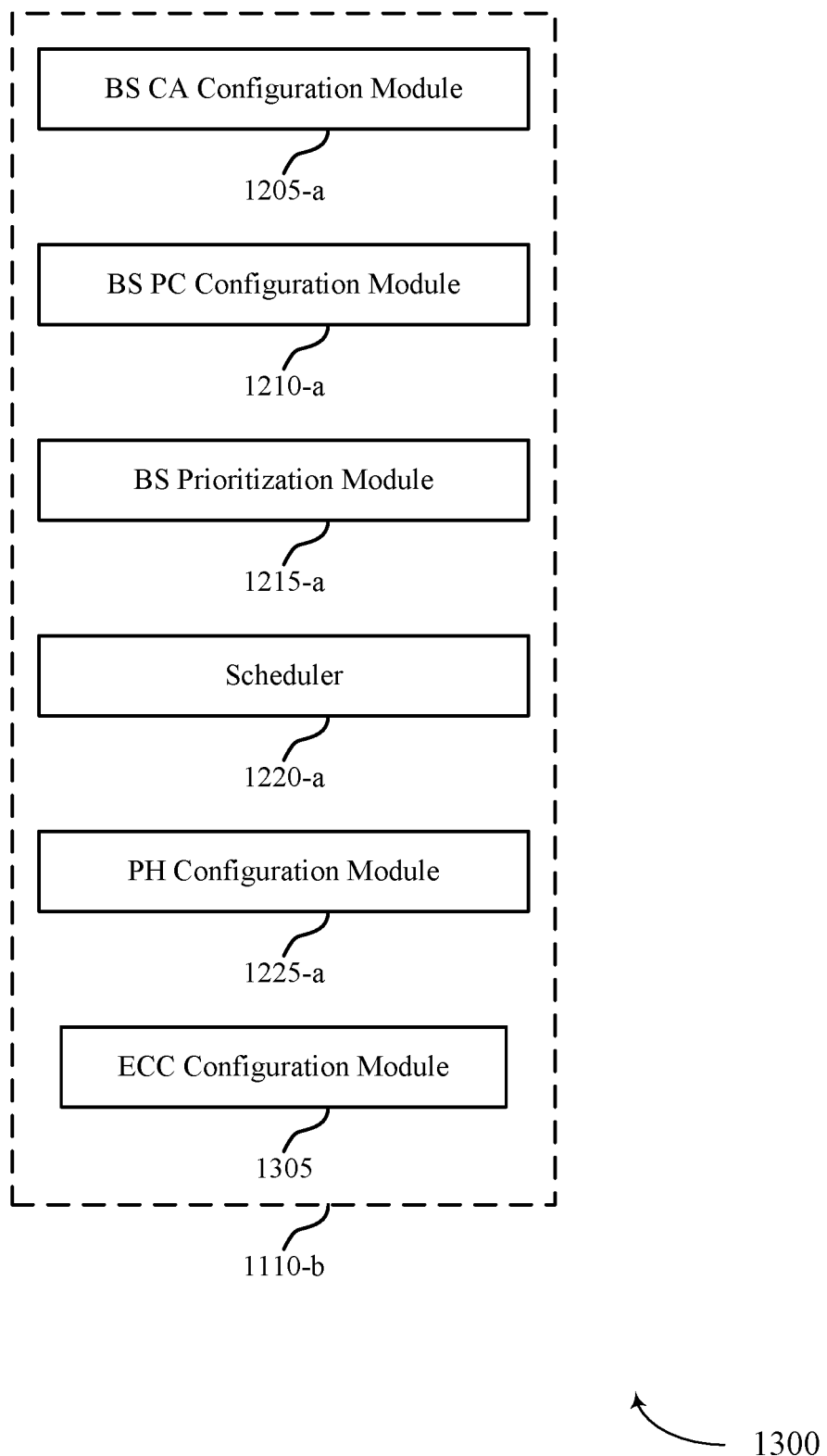

FIG. 13 shows a block diagram 1300 of a base station eCC power control module 1110-b which may be a component of a wireless device 1100 or a wireless device 1200 for power control and power headroom reporting for CA with an eCC in accordance with various aspects of the present disclosure. The base station eCC power control module 1110-b may be an example of aspects of a base station eCC power control module 1110 described with reference to FIGS. 11-12. The base station eCC power control module 1110-b may include a BS CA configuration module 1205-a, a BS PC configuration module 1210-a, a BS prioritization module 1215-a, a scheduler 1220-a, and a PH configuration module 1225-a. Each of these modules may perform the functions described herein with reference to FIG. 12. The base station eCC power control module 1110-b may also include and an eCC configuration module 1305.

The eCC configuration module 1305 may be configured such that the first carrier may be a PCell and the second carrier may be an eCC cell configured for eCC operation as described herein with reference to FIGS. 2-6.

Figure 14:
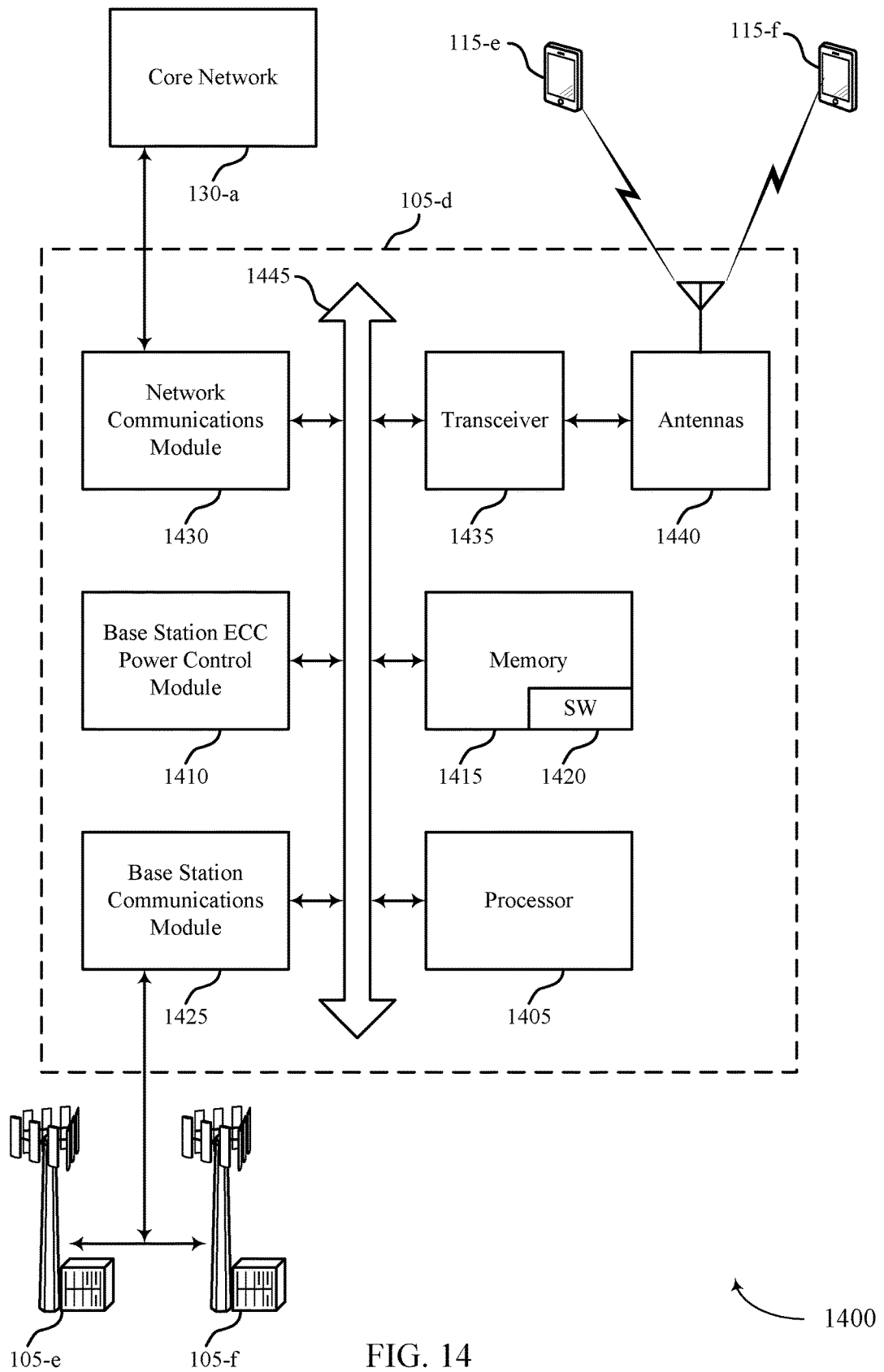
FIG. 14 illustrates a diagram of a system including a base station that supports power control and power headroom reporting for CA within an eCC in accordance with various aspects of the present disclosure.

FIG. 14 shows a diagram of a system 1400 including a base station 105 configured for power control and power headroom reporting for CA with an eCC in accordance with various aspects of the present disclosure. System 1400 may include base station 105-d, which may be an example of a wireless device 1100, a wireless device 1200, or a base station 105 described herein with reference to FIGS. 1, 2, and 11-13. Base station 105-d may include a base station eCC power control module 1410, which may be an example of a base station eCC power control module 1110 described with reference to FIGS. 11-13. Base station 105-*d* may also include components for bi-directional voice and data communications including components for transmitting communications and components for receiving communications. For example, base station 105-*d* may communicate bi-directionally with UE 115-*e* or UE 115-*f*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1425. In some examples, base station communication module 1425 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 1430.

Base station 105-*d* may include a processor 1405, memory 1415 (including software (SW) 1420), transceiver 1435, and antenna(s) 1440, which each may be in communication, directly or indirectly, with one another (e.g., over bus system 1445). The transceivers 1435 may be configured to communicate bi-directionally, via the antenna(s) 1440, with the UEs 115, which may be multi-mode devices. The transceiver 1435 (or other components of the base station 105-*d*) may also be configured to communicate bi-directionally, via the antennas 1440, with one or more other base stations (not shown). The transceiver 1435 may include a modem configured to modulate the packets and provide the modulated packets to the antennas 1440 for transmission, and to demodulate packets received from the antennas 1440. The base station 105-*d* may include multiple transceivers 1435, each with one or more associated antennas 1440. The transceiver may be an example of a combined receiver 1105 and transmitter 1115 of FIG. 11.

The memory 1415 may include RAM and ROM. The memory 1415 may also store computer-readable, computer-executable software code 1420 containing instructions that are configured to, when executed, cause the processor 1410 to perform various functions described herein (e.g., power control and power headroom in eCC, selecting coverage enhancement techniques, call processing, database management, message routing, etc.). Alternatively, the software 1420 may not be directly executable by the processor 1405 but be configured to cause the computer (e.g., when compiled and executed) to perform functions described herein. The processor 1405 may include an intelligent hardware device (e.g., a CPU, a microcontroller, an ASIC, etc.). The processor 1405 may include various special purpose processors such as encoders, queue processing modules, base band processors, radio head controllers, digital signal processors (DSPs), and the like.

The base station communications module 1425 may manage communications with other base stations 105. The communications management module may include a controller or scheduler for controlling communications with UEs 115 in cooperation with other base stations 105. For example, the base station communications module 1425 may coordinate scheduling for transmissions to UEs 115 for various interference mitigation techniques such as beamforming or joint transmission.

The components of wireless device 700, wireless device 800, eCC power control module 710, system 1000, wireless device 1100, wireless device 1200, base station eCC power control module 1110 or system 1400 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field-programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 15:
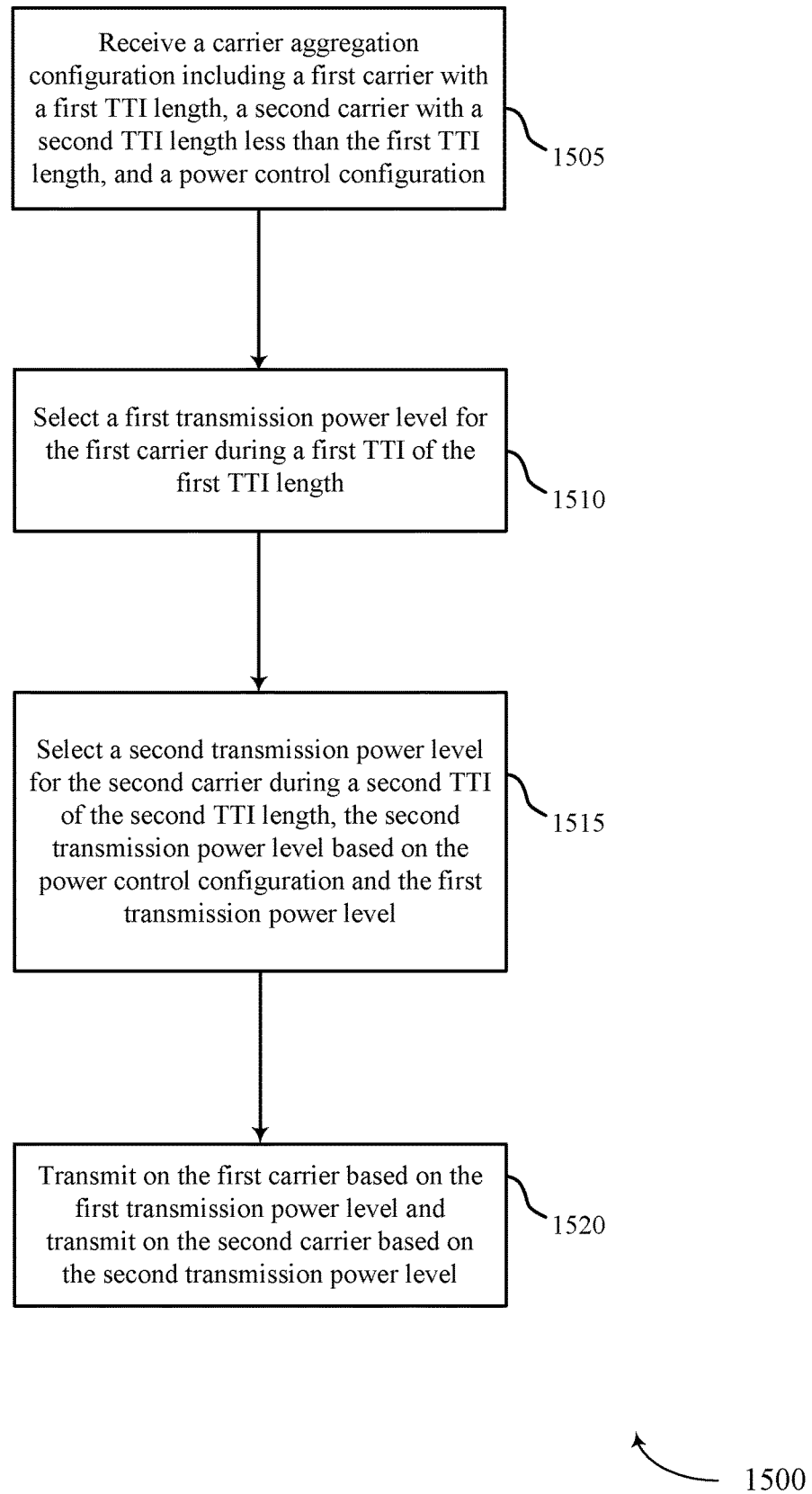
FIGS. 15-18 illustrate methods for power control and power headroom reporting for CA with an eCC in accordance with various aspects of the present disclosure.

FIG. 15 shows a flowchart illustrating a method 1500 for power control and power headroom reporting for CA with an eCC in accordance with various aspects of the present disclosure. The operations of method 1500 may be implemented by a UE 115 or its components as described with reference to FIGS. 1-14. For example, the operations of method 1500 may be performed by the eCC power control module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware.

At block 1505, the UE 115 may receive a CA configuration including a first carrier with a first TTI length, a second carrier with a second TTI length less than the first TTI length, and a power control configuration as described herein with reference to FIGS. 2-6. In certain examples, the operations of block 1505 may be performed by the CA configuration module 805 as described herein with reference to FIG. 8.

At block 1510, the UE 115 may FIGs. FIG. select a first transmission power level for the first carrier during a first TTI of the first TTI length as described herein with reference to FIGS. 2-6. In certain examples, the operations of block 1515 may be performed by the transmission power controller 815 as described herein with reference to FIG. 8.

At block 1515, the UE 115 may select a second transmission power level for the second carrier during a second TTI of the second TTI length. The first TTI may overlap the second TTI. The second transmission power level may be based on the power control configuration and the first transmission power level as described herein with reference to FIGS. 2-6. In certain examples, the operations of block 1515 may be performed by the transmission power controller 815 as described herein with reference to FIG. 8.

At block 1520, the UE 115 may transmit on a first carrier based at least in part on the first transmission power level as described herein with reference to FIGS. 2-6. The UE may also transmit on a second carrier based at least in part on the second transmission power level as described herein with reference to FIGS. 2-6. In certain examples, the operations of block 1520 may be performed by the transmitter 715 as described herein with reference to FIGS. 7-8.

Figure 16:
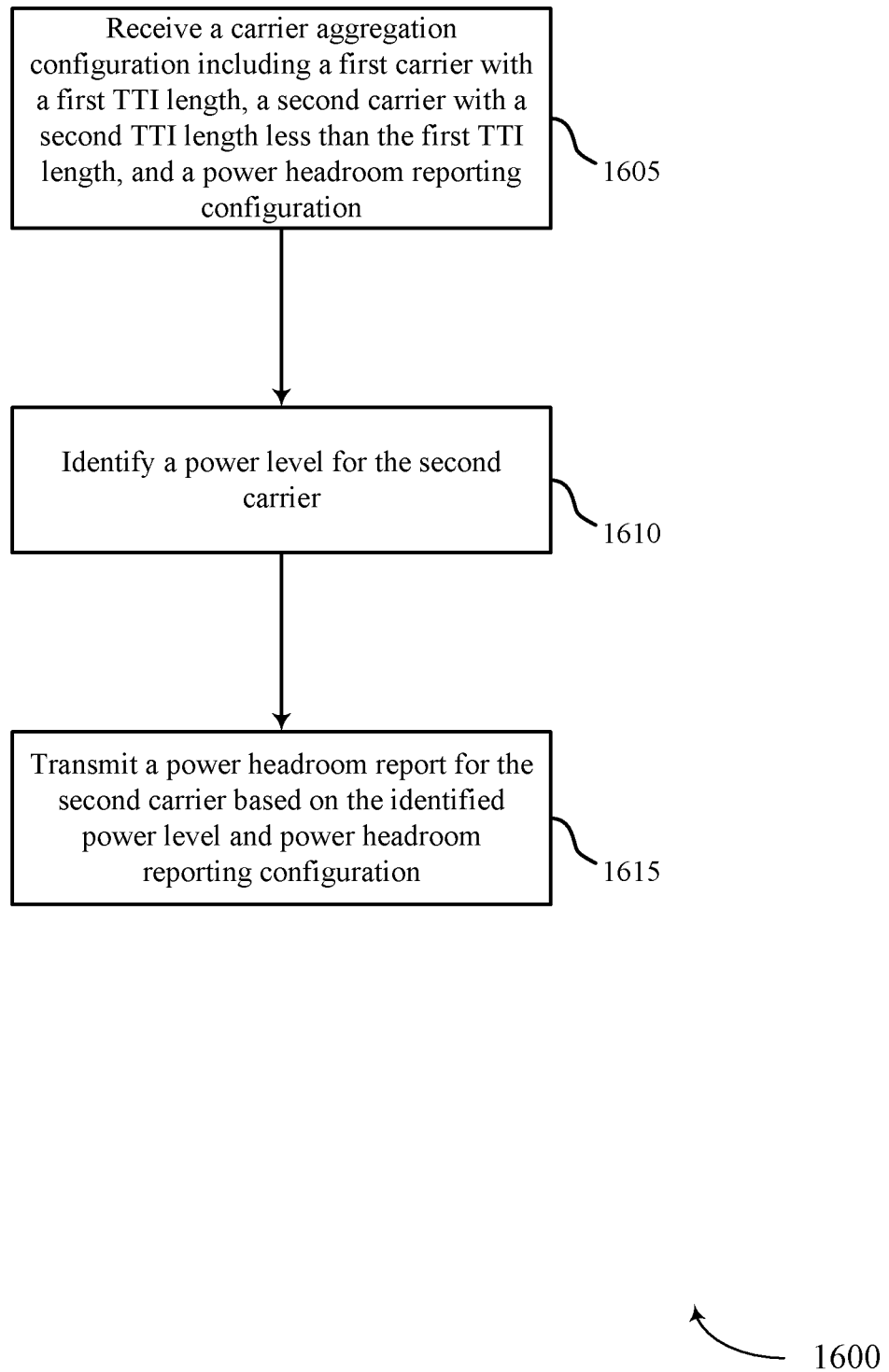

FIG. 16 shows a flowchart illustrating a method 1600 for power control and power headroom reporting for CA with an eCC in accordance with various aspects of the present disclosure. The operations of method 1600 may be implemented by a UE 115 or its components as described with reference to FIGS. 1-14. For example, the operations of method 1600 may be performed by the eCC power control module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of method 1500 of FIG. 15.

At block 1605, the UE 115 may determine a CA configuration including a first carrier with a first TTI length, a second carrier with a second TTI length less than the first TTI length, and a power headroom reporting configuration as described herein with reference to FIGS. 2-6. In certain examples, the operations of block 1605 may be performed by the CA configuration module 805 as described herein with reference to FIG. 8.

At block 1610, the UE 115 may identify a power level for the second carrier as described herein with reference to FIGS. 2-6. In certain examples, the operations of block 1610 may be performed by the PC configuration module 810 as described herein with reference to FIG. 8.

At block 1615, the UE 115 may transmit a PHR for the second carrier based on the identified power level and the power headroom reporting configuration as described herein with reference to FIGS. 2-6. In certain examples, the operations of block 1615 may be performed by the power headroom module 920 as described herein with reference to FIG. 9.

Figure 17:
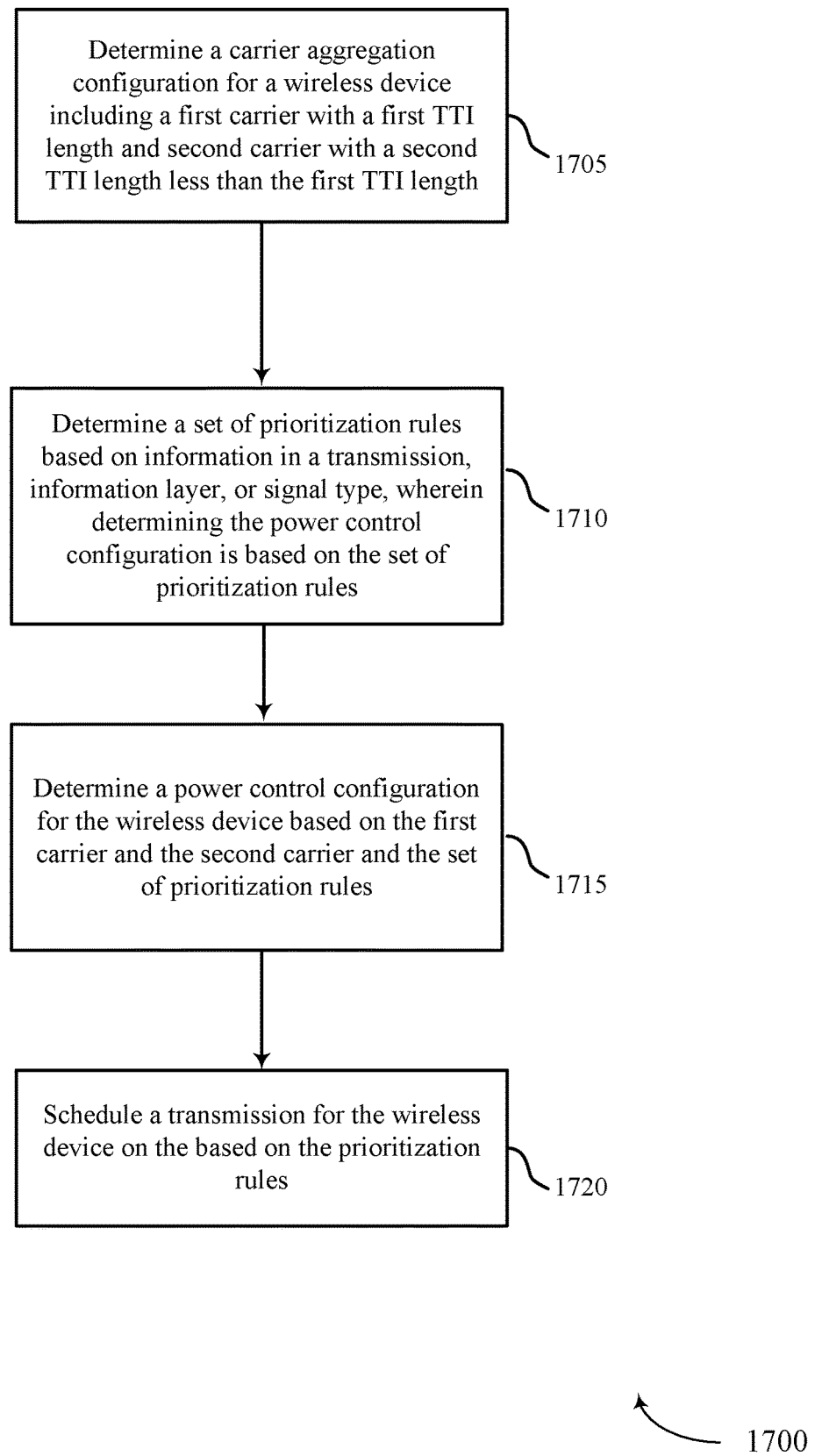

FIG. 17 shows a flowchart illustrating a method 1700 for power control and power headroom reporting for CA with an eCC in accordance with various aspects of the present disclosure. The operations of method 1700 may be implemented by a base station 105 or its components as described with reference to FIGS. 1-14. For example, the operations of method 1700 may be performed by the base station eCC power control module 1110 as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1500, and 1600 of FIGS. 15-16.

At block 1705, the base station 105 may determine a carrier aggregation configuration for a wireless device including a first carrier with a first TTI length and second carrier with a second TTI length less than the first TTI length as described herein with reference to FIGS. 2-6. In certain examples, the operations of block 1705 may be performed by the BS CA configuration module 1205 as described herein with reference to FIG. 12.

At block 1710, the base station 105 may determine a set of prioritization rules based on information in a transmission, information layer or signal type. Thus, determining the power control configuration may be based on the set of prioritization rules as described herein with reference to FIGS. 2-6. In certain examples, the operations of block 1710 may be performed by the BS prioritization module 1215 as described herein with reference to FIG. 12.

At block 1715, the base station 105 may determine a power control configuration for the wireless device based on the first carrier and the second carrier and the set of prioritization rule, as described herein with reference to FIGS. 2-6. In certain examples, the operations of block 1715 may be performed by the BS PC configuration module 1210 as described herein with reference to FIG. 12.

At block 1720, the base station 105 may schedule a transmission for the wireless device on the based on the prioritization rules as described herein with reference to FIGS. 2-6. In certain examples, the operations of block 1720 may be performed by the scheduler 1220 as described herein with reference to FIG. 12.

Figure 18:
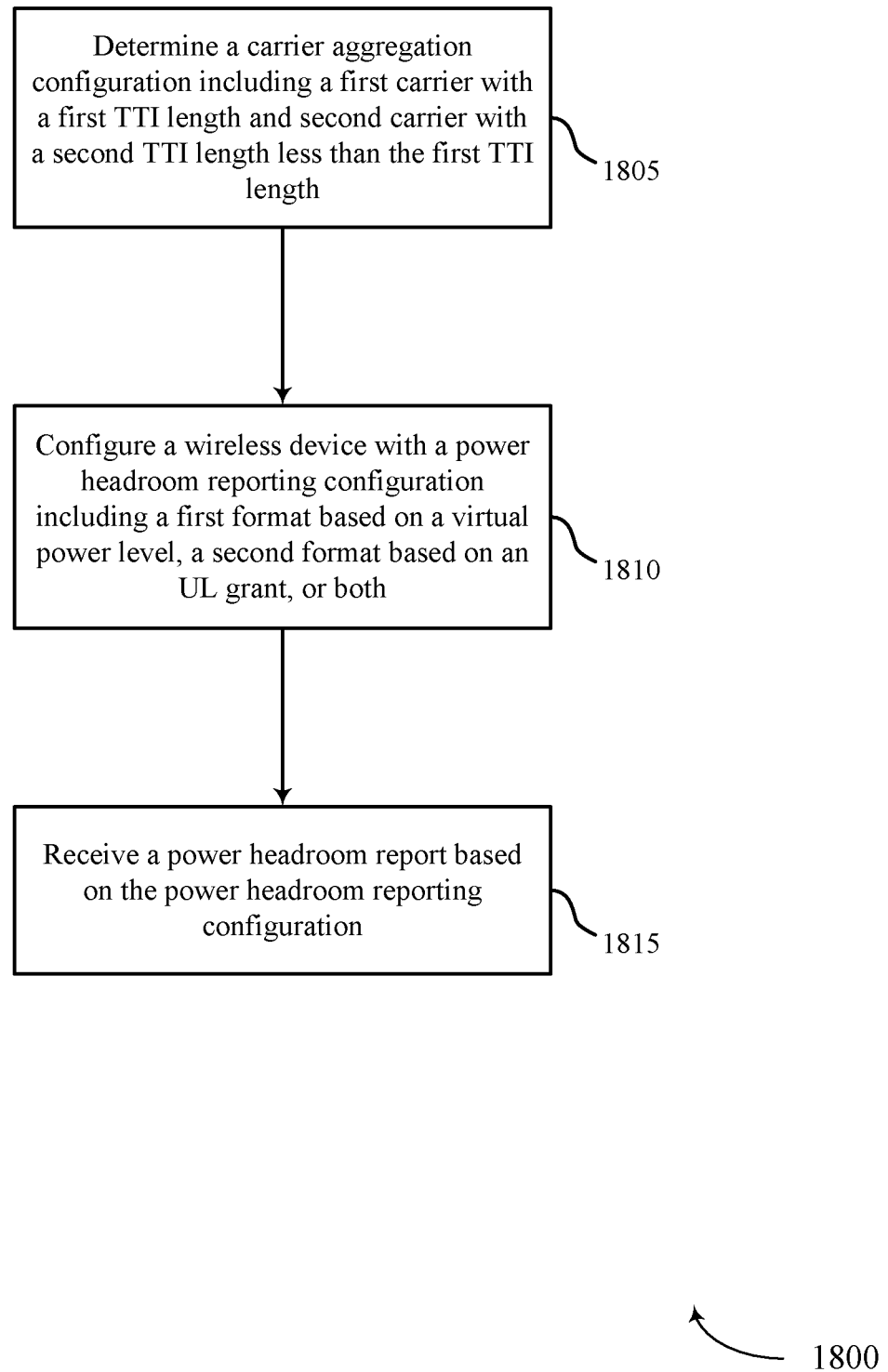

FIG. 18 shows a flowchart illustrating a method 1800 for power control and power headroom reporting for CA with an eCC in accordance with various aspects of the present disclosure. The operations of method 1800 may be implemented by a base station 105 or its components as described with reference to FIGS. 1-14. For example, the operations of method 1800 may be performed by the base station eCC power control module 1110 as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1500, 1600, and 1700 of FIGS. 15-17.

At block 1805, the base station 105 may determine a CA configuration including a first carrier with a first TTI length and second carrier with a second TTI length less than the first TTI length as described herein with reference to FIGS. 2-6. In certain examples, the operations of block 1805 may be performed by the CA configuration module 805 as described herein with reference to FIG. 8.

At block 1810, the base station 105 may configure a wireless device with a power headroom reporting configuration that includes at least one first format based on a virtual power level, at least one second format based on an UL grant, or both as described herein with reference to FIGS. 2-6. In certain examples, the operations of block 1810 may be performed by the PH configuration module 1225 as described herein with reference to FIG. 12.

At block 1815, the base station 105 may receive a PHR based on the power headroom reporting configuration as described herein with reference to FIGS. 2-6. In certain examples, the operations of block 1815 may be performed by the receiver 1105 as described herein with reference to FIG. 11.

Thus, methods 1500, 1600, 1700, and 1800 may provide for power control and power headroom in eCC. It should be noted that methods 1500, 1600, 1700, and 1800 describe possible implementation, and that the operations and the steps may be rearranged or otherwise modified such that other implementations are possible. In some examples, aspects from two or more of the methods 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3rd Generation Partnership Project (3GPP) LTE and LTE-A are new releases of Universal Mobile Telecommunications System (UMTS) that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved NodeB (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
    receiving a carrier aggregation configuration comprising a first carrier with a first transmission time interval (TTI) length, a second carrier with a second TTI length different from the first TTI length, and a power control configuration;
    selecting a first transmission power level for the first carrier during a first TTI of the first TTI length;
    selecting a second transmission power level for the second carrier during a second TTI of the second TTI length, wherein the first TTI overlaps the second TTI and the second transmission power level is based at least in part on the power control configuration and the first transmission power level;
    transmitting on the first carrier based at least in part on the first transmission power level; and
    transmitting on the second carrier based at least in part on the second transmission power level.

2. The method of claim 1, wherein selecting the first transmission power level comprises:
    reducing a transmission power level for the first carrier based at least in part on the power control configuration.

3. The method of claim 2, further comprising:
    identifying a reserved power level for the second carrier, wherein reducing the transmission power level for the first carrier is based at least in part on the reserved power level.

4. The method of claim 3, wherein the second transmission power level is selected based at least in part on utilizing power made available by reducing the transmission power level for the first carrier.

5. The method of claim 2, wherein reducing the transmission power level for the first carrier comprises:
    selecting a transmission power level for the first carrier during at least one symbol period of the first TTI that is different from a transmission power level for the first carrier during at least one second symbol period of the first TTI, wherein the transmission power level for the first carrier during the at least one symbol period is based at least in part on the power control configuration and the transmission power level for the second carrier during the second TTI.

6. The method of claim 1, further comprising:
    identifying a set of prioritization rules based at least in part on information in a transmission, information layer, signal type, or any combination thereof, wherein the power control configuration is based at least in part on the set of prioritization rules.

7. The method of claim 6, wherein the set of prioritization rules comprises a rule prioritizing symbols containing uplink control information (UCI) on a primary cell (PCell), a rule prioritizing PCell demodulation reference signal (DM-RS) transmissions over physical uplink shared channel (PUSCH) enhanced component carrier (eCC) symbols, or a rule prioritizing eCC PUSCH symbols over PCell sounding reference signal (SRS) transmissions.

8. The method of claim 1, wherein the first TTI is a Long Term Evolution (LTE) subframe and the second TTI is an LTE symbol period.

9. The method of claim 1, wherein the power control configuration is based at least in part on a traffic type or a traffic volume on the second carrier.

10. An apparatus for wireless communication, comprising:
   means for determining a carrier aggregation configuration comprising a first carrier with a first transmission time interval (TTI) length, a second carrier with a second TTI length different from the first TTI length, and a power control configuration;
   means for selecting a first transmission power level for the first carrier during a first TTI of the first TTI length;
   means for selecting a second transmission power level for the second carrier during a second TTI of the second TTI length, wherein the first TTI overlaps the second TTI and the second transmission power level is based at least in part on the power control configuration and the first transmission power level;
   means for transmitting on the first carrier based at least in part on the first transmission power level; and
   means for transmitting on the second carrier based at least in part on the second transmission power level.

11. The apparatus of claim 10, wherein the means for selecting the first transmission power level comprises:
   means for reducing a transmission power level for the first carrier based at least in part on the power control configuration.

12. The apparatus of claim 11, further comprising:
   means for identifying a reserved power level for the second carrier, wherein the means for reducing the transmission power level for the first carrier is operable to reduce the transmission power level for the first carrier based at least in part on the reserved power level.

13. The apparatus of claim 12, wherein the second transmission power level is selected based at least in part on utilizing power made available by reducing the transmission power level for the first carrier.

14. The apparatus of claim 11, wherein means for reducing the transmission power level for the first carrier comprises:
   means for selecting a transmission power level for the first carrier during at least one symbol period of the first TTI that is different from a transmission power level for the first carrier during at least one second symbol period of the first TTI, wherein the transmission power level for the first carrier during the at least one symbol period is based at least in part on the power control configuration and the transmission power level for the second carrier during the second TTI.

15. The apparatus of claim 10, further comprising:
   means for identifying a set of prioritization rules based at least in part on information in a transmission, information layer, signal type, or any combination thereof, wherein the power control configuration is based at least in part on the set of prioritization rules.

16. The apparatus of claim 15, wherein the set of prioritization rules comprises a rule prioritizing symbols containing uplink control information (UCI) on a primary cell (PCell), a rule prioritizing PCell demodulation reference signal (DM-RS) transmissions over physical uplink shared channel (PUSCH) enhanced component carrier (eCC) symbols, or a rule prioritizing eCC PUSCH symbols over PCell sounding reference signal (SRS) transmissions.

17. The apparatus of claim 10, wherein the first TTI is a Long Term Evolution (LTE) subframe and the second TTI is an LTE symbol period.

18. The apparatus of claim 10, wherein the power control configuration is based at least in part on a traffic type or a traffic volume on the second carrier.

19. An apparatus for wireless communication, comprising:
   a processor;
   memory in electronic communication with the processor; and
   instructions stored in the memory and operable, when executed by the processor, to cause the apparatus to:
      receive a carrier aggregation configuration comprising a first carrier with a first transmission time interval (TTI) length, a second carrier with a second TTI length different from the first TTI length, and a power control configuration;
      select a first transmission power level for the first carrier during a first TTI of the first TTI length;
      select a second transmission power level for the second carrier during a second TTI of the second TTI length, wherein the first TTI overlaps the second TTI and the second transmission power level is based at least in part on the power control configuration and the first transmission power level;
      transmit on the first carrier based at least in part on the first transmission power level; and
      transmit on the second carrier based at least in part on the second transmission power level.

20. The apparatus of claim 19, wherein the instructions are operable to cause the apparatus to:
   reduce a transmission power level for the first carrier based at least in part on the power control configuration.

21. The apparatus of claim 20, wherein the instructions are operable to cause the apparatus to:
   identify a reserved power level for the second carrier, wherein reducing the transmission power level for the first carrier is based at least in part on the reserved power level.

22. The apparatus of claim 21, wherein the second transmission power level is selected based at least in part on utilizing power made available by reducing the transmission power level for the first carrier.

23. The apparatus of claim 20, wherein the instructions are operable to cause the apparatus to:
   select a transmission power level for the first carrier during at least one symbol period of the first TTI that is different from a transmission power level for the first carrier during at least one second symbol period of the first TTI, wherein the transmission power level for the first carrier during the at least one symbol period is based at least in part on the power control configuration and the transmission power level for the second carrier during the second TTI.

24. The apparatus of claim 19, wherein the instructions are operable to cause the apparatus to:
   identify a set of prioritization rules based at least in part on information in a transmission, information layer, signal type, or any combination thereof, wherein the power control configuration is based at least in part on the set of prioritization rules.

25. The apparatus of claim 24, wherein the set of prioritization rules comprises a rule prioritizing symbols containing uplink control information (UCI) on a primary cell (PCell), a rule prioritizing PCell demodulation reference signal (DM-RS) transmissions over physical uplink shared channel (PUSCH) enhanced component carrier (eCC) symbols, or a rule prioritizing eCC PUSCH symbols over PCell sounding reference signal (SRS) transmissions.

26. The apparatus of claim 19, wherein the first TTI is a Long Term Evolution (LTE) subframe and the second TTI is an LTE symbol period.

27. The apparatus of claim 19, wherein the power control configuration is based at least in part on a traffic type or a traffic volume on the second carrier.

28. A non-transitory computer-readable medium storing code for wireless communication, the code comprising instructions executable to:
    determine a carrier aggregation configuration comprising a first carrier with a first transmission time interval (TTI) length, a second carrier with a second TTI length different from the first TTI length, and a power control configuration;
    select a first transmission power level for the first carrier during a first TTI of the first TTI length;
    select a second transmission power level for the second carrier during a second TTI of the second TTI length, wherein the first TTI overlaps the second TTI and the second transmission power level is based at least in part on the power control configuration and the first transmission power level;
    transmit on the first carrier based at least in part on the first transmission power level; and
    transmit on the second carrier based at least in part on the second transmission power level.

29. The non-transitory computer-readable medium of claim 28, wherein the instructions are executable to:
    reduce a transmission power level for the first carrier based at least in part on the power control configuration.

30. The non-transitory computer-readable medium of claim 29, wherein the instructions are executable to:
    identify a reserved power level for the second carrier, wherein reducing the transmission power level for the first carrier is based at least in part on the reserved power level.

31. The non-transitory computer-readable medium of claim 30, wherein the second transmission power level is selected based at least in part on utilizing power made available by reducing the transmission power level for the first carrier.

32. The non-transitory computer-readable medium of claim 29, wherein the instructions are executable to:
    select a transmission power level for the first carrier during at least one symbol period of the first TTI that is different from a transmission power level for the first carrier during at least one second symbol period of the first TTI, wherein the transmission power level for the first carrier during the at least one symbol period is based at least in part on the power control configuration and the transmission power level for the second carrier during the second TTI.

33. The non-transitory computer-readable medium of claim 28, wherein the instructions are executable to:
    identify a set of prioritization rules based at least in part on information in a transmission, information layer, signal type, or any combination thereof, wherein the power control configuration is based at least in part on the set of prioritization rules.

34. The non-transitory computer-readable medium of claim 33, wherein the set of prioritization rules comprises a rule prioritizing symbols containing uplink control information (UCI) on a primary cell (PCell), a rule prioritizing PCell demodulation reference signal (DM-RS) transmissions over physical uplink shared channel (PUSCH) enhanced component carrier (eCC) symbols, or a rule prioritizing eCC PUSCH symbols over PCell sounding reference signal (SRS) transmissions.

35. The non-transitory computer-readable medium of claim 28, wherein the first TTI is a Long Term Evolution (LTE) subframe and the second TTI is an LTE symbol period.

36. The non-transitory computer-readable medium of claim 28, wherein the power control configuration is based at least in part on a traffic type or a traffic volume on the second carrier.

* * * * *